United States Patent
Abileah et al.

(10) Patent No.: US 9,411,470 B2
(45) Date of Patent: Aug. 9, 2016

(54) LIGHT SENSITIVE DISPLAY WITH MULTIPLE DATA SET OBJECT DETECTION

(75) Inventors: Adiel Abileah, Portland, OR (US); Willem den Boer, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 1454 days.

(21) Appl. No.: 12/568,302

(22) Filed: Sep. 28, 2009

(65) Prior Publication Data

US 2010/0013794 A1 Jan. 21, 2010

Related U.S. Application Data

(63) Continuation of application No. 11/901,649, filed on Sep. 18, 2007, now Pat. No. 9,134,851, which is a continuation of application No. 10/371,413, filed on Feb. 20, 2003, now Pat. No. 7,280,102.

(60) Provisional application No. 60/359,263, filed on Feb. 20, 2002, provisional application No. 60/383,040, filed on May 23, 2002.

(51) Int. Cl.
*G06F 3/042* (2006.01)
*G06F 1/16* (2006.01)
(Continued)

(52) U.S. Cl.
CPC ............ *G06F 3/042* (2013.01); *G02F 1/13338* (2013.01); *G06F 1/1611* (2013.01);
(Continued)

(58) Field of Classification Search
CPC ............ G06F 3/03542; G06F 3/03545; G06F 3/0412; G06F 3/0418; G06F 3/042; G06F 3/0488; G06F 2203/04109; G06F 1/1611; G02F 1/13338; G02F 2001/13312; G06K 9/0004; G09G 3/3648; G09G 2300/0439; G09G 2300/0809; G09G 2300/0842; G09G 2320/029; G09G 2320/0626; G09G 2360/144
USPC ...................... 345/81, 98–100, 104, 173–183, 345/204–205, 207; 349/12, 68, 77, 83, 110, 349/116, 193
See application file for complete search history.

(56) References Cited

U.S. PATENT DOCUMENTS 3,970,846 A 7/1976 Schofield et al.
4,220,815 A 9/1980 Gibson et al.
(Continued)

FOREIGN PATENT DOCUMENTS

DE 3602796 8/1987
DE 19720925 12/1997
(Continued)

OTHER PUBLICATIONS

Yamaguchi et al., "Two-dimensional Contact-Type Image Sensor Using Amorphous Silicon Photo-Transistor," Jpn. J. Appl. Phys., vol. 32, pp. 458-461, Jan. 1993.
(Continued)

*Primary Examiner* — Keith Crawley
(74) *Attorney, Agent, or Firm* — Morrison & Foerster LLP

(57) ABSTRACT

A display device including a surface for viewing an image comprising a stack of layers configured to display the image and a first and second set of light sensitive elements included in the stack. The first set of light sensitive elements is configured to provide a first data set corresponding to an object on or near the surface based on a first sensitivity to light. The second set of light sensitive elements is configured to provide a second data set corresponding to the object on or near the surface based on a second sensitivity to light. One of the first and the second data sets is selected and a location of the object on or near the surface is determined based on the selected data set.

17 Claims, 22 Drawing Sheets

(51) Int. Cl.

| | | |
|---|---|---|
| *G02F 1/1333* | (2006.01) | |
| *G06F 3/041* | (2006.01) | |
| *G06F 3/0488* | (2013.01) | |
| *G06K 9/00* | (2006.01) | |
| *G09G 3/36* | (2006.01) | |
| *G06F 3/0354* | (2013.01) | |
| *G02F 1/133* | (2006.01) | |

(52) U.S. Cl.
CPC ........ *G06F3/03542* (2013.01); *G06F 3/03545* (2013.01); *G06F 3/0412* (2013.01); *G06F 3/0418* (2013.01); *G06F 3/0488* (2013.01); *G06K 9/0004* (2013.01); *G09G 3/3648* (2013.01); *G02F 2001/13312* (2013.01); *G06F 2203/04109* (2013.01); *G09G 2300/0439* (2013.01); *G09G 2300/0809* (2013.01); *G09G 2300/0842* (2013.01); *G09G 2320/029* (2013.01); *G09G 2320/0626* (2013.01); *G09G 2360/144* (2013.01)

(56) References Cited

U.S. PATENT DOCUMENTS

| | | | |
|---|---|---|---|
| 4,320,292 A | 3/1982 | Oikawa et al. | |
| 4,334,219 A | 6/1982 | Paülus et al. | |
| 4,345,248 A | 8/1982 | Togashi et al. | |
| 4,405,921 A | 9/1983 | Mukaiyama | |
| 4,476,463 A | 10/1984 | Ng et al. | |
| 4,481,510 A | 11/1984 | Hareng et al. | |
| 4,484,179 A | 11/1984 | Kasday | |
| 4,490,607 A | 12/1984 | Pease et al. | |
| 4,496,981 A | 1/1985 | Ota | |
| 4,542,375 A | 9/1985 | Alles et al. | |
| 4,602,321 A | 7/1986 | Bornhorst | |
| 4,603,356 A | 7/1986 | Bates | |
| 4,642,459 A | 2/1987 | Casewell et al. | |
| 4,644,338 A | 2/1987 | Aoki et al. | |
| 4,655,552 A | 4/1987 | Togashi et al. | |
| 4,662,718 A | 5/1987 | Masubuchi | |
| 4,671,671 A | 6/1987 | Suetaka | |
| 4,677,428 A | 6/1987 | Bartholow | |
| 4,679,909 A | 7/1987 | Hamada et al. | |
| 4,684,939 A | 8/1987 | Streit | |
| 4,698,460 A | 10/1987 | Krein et al. | |
| 4,705,942 A | 11/1987 | Budrikis et al. | |
| 4,720,869 A | 1/1988 | Wadia | |
| 4,736,203 A | 4/1988 | Sidlauskas | |
| 4,740,782 A | 4/1988 | Aoki et al. | |
| 4,749,879 A | 6/1988 | Peterson et al. | |
| 4,759,610 A | 7/1988 | Yanagisawa | |
| 4,767,192 A | 8/1988 | Chang et al. | |
| 4,772,101 A | 9/1988 | Liu | |
| 4,782,327 A | 11/1988 | Kley et al. | |
| 4,782,328 A | 11/1988 | Denlinger | |
| 4,785,564 A | 11/1988 | Gurtler | |
| 4,794,634 A | 12/1988 | Torihata et al. | |
| 4,814,760 A | 3/1989 | Johnston et al. | |
| 4,823,178 A | 4/1989 | Suda | |
| 4,838,655 A | 6/1989 | Hunahata et al. | |
| 4,877,697 A | 10/1989 | Vollmann et al. | |
| 4,893,120 A | 1/1990 | Doering et al. | |
| 4,904,056 A | 2/1990 | Castleberry | |
| 4,917,474 A | 4/1990 | Yamazaki et al. | |
| 4,940,901 A | 7/1990 | Henry et al. | |
| 5,003,356 A | 3/1991 | Wakai et al. | |
| 5,039,206 A | 8/1991 | Wiltshire | |
| 5,051,570 A | 9/1991 | Tsujikawa et al. | |
| 5,063,379 A | 11/1991 | Fabry et al. | |
| 5,083,175 A | 1/1992 | Hack et al. | |
| 5,105,186 A | 4/1992 | May | |
| 5,140,153 A | 8/1992 | Heikkinen et al. | |
| 5,151,688 A | 9/1992 | Tanaka et al. | |
| 5,153,420 A | 10/1992 | Hack et al. | |
| 5,172,104 A | 12/1992 | Tanigaki et al. | |
| 5,182,661 A | 1/1993 | Ikeda et al. | |
| 5,204,661 A | 4/1993 | Hack et al. | |
| 5,236,850 A | 8/1993 | Zhang | |
| 5,237,314 A | 8/1993 | Knapp | |
| 5,239,152 A | 8/1993 | Caldwell et al. | |
| 5,243,332 A | 9/1993 | Jacobson | |
| 5,276,538 A | 1/1994 | Monji et al. | |
| 5,301,048 A | 4/1994 | Huisman | |
| 5,308,964 A | 5/1994 | Kwon | |
| 5,339,090 A | 8/1994 | Crossland et al. | |
| 5,339,091 A | 8/1994 | Yamazaki et al. | |
| 5,341,133 A | 8/1994 | Savoy et al. | |
| 5,349,174 A | 9/1994 | Van Berkel et al. | |
| 5,360,426 A | 11/1994 | Muller et al. | |
| 5,369,262 A | 11/1994 | Dvorkis et al. | |
| 5,376,948 A | 12/1994 | Roberts | |
| 5,381,251 A | 1/1995 | Nonomura et al. | |
| 5,386,543 A | 1/1995 | Bird | |
| 5,387,445 A | 2/1995 | Horiuchi et al. | |
| 5,414,283 A | 5/1995 | den Boer et al. | |
| 5,422,693 A | 6/1995 | Vogeley et al. | |
| 5,430,462 A | 7/1995 | Katagiri et al. | |
| 5,445,871 A | 8/1995 | Murase et al. | |
| 5,446,564 A | 8/1995 | Mawatari et al. | |
| 5,461,400 A | 10/1995 | Ishii et al. | |
| 5,475,398 A | 12/1995 | Yamazaki et al. | |
| 5,483,263 A | 1/1996 | Bird et al. | |
| 5,485,177 A | 1/1996 | Shannon et al. | |
| 5,502,514 A | 3/1996 | Vogeley et al. | |
| 5,510,916 A | 4/1996 | Takahashi | |
| 5,515,186 A | 5/1996 | Fergason et al. | |
| 5,525,813 A | 6/1996 | Miyake et al. | |
| 5,532,743 A | 7/1996 | Komobuchi | |
| 5,559,471 A | 9/1996 | Black | |
| 5,568,292 A | 10/1996 | Kim | |
| 5,581,378 A | 12/1996 | Kulick et al. | |
| 5,585,817 A | 12/1996 | Itoh et al. | |
| 5,589,961 A | 12/1996 | Shigeta et al. | |
| 5,598,004 A | 1/1997 | Powell et al. | |
| 5,610,629 A | 3/1997 | Baur | |
| 5,635,982 A | 6/1997 | Zhang et al. | |
| 5,637,187 A | 6/1997 | Takasu et al. | |
| 5,652,600 A | 7/1997 | Khormaei et al. | |
| 5,659,332 A | 8/1997 | Ishii et al. | |
| 5,677,744 A | 10/1997 | Yoneda et al. | |
| 5,712,528 A | 1/1998 | Barrow et al. | |
| 5,734,491 A | 3/1998 | Debesis | |
| 5,751,453 A | 5/1998 | Baur | |
| 5,757,522 A | 5/1998 | Kulick et al. | |
| 5,767,623 A | 6/1998 | Friedman et al. | |
| 5,777,713 A | 7/1998 | Kimura | |
| 5,778,108 A | 7/1998 | Coleman, Jr. | |
| 5,793,342 A | 8/1998 | Rhoads | |
| 5,796,121 A | 8/1998 | Gates | |
| 5,796,473 A | 8/1998 | Murata et al. | |
| 5,812,109 A | 9/1998 | Kaifu et al. | |
| 5,818,037 A | 10/1998 | Redford et al. | |
| 5,818,553 A | 10/1998 | Koenck et al. | |
| 5,818,956 A | 10/1998 | Tuli | |
| 5,831,693 A | 11/1998 | McCartney, Jr. et al. | |
| 5,834,765 A | 11/1998 | Ashdown | |
| 5,838,290 A | 11/1998 | Kuijk | |
| 5,838,308 A | 11/1998 | Knapp et al. | |
| 5,852,487 A | 12/1998 | Fujimori et al. | |
| 5,877,735 A | 3/1999 | King et al. | |
| 5,883,715 A | 3/1999 | Steinlechner et al. | |
| 5,890,799 A | 4/1999 | Yiu et al. | |
| 5,917,464 A | 6/1999 | Stearns | |
| 5,920,360 A | 7/1999 | Coleman, Jr. | |
| 5,926,238 A | 7/1999 | Inoue et al. | |
| 5,930,591 A | 7/1999 | Huang | |
| 5,940,049 A | 8/1999 | Hinman et al. | |
| 5,942,761 A | 8/1999 | Tuli | |
| 5,959,617 A | 9/1999 | Bird et al. | |
| 5,959,697 A | 9/1999 | Coleman, Jr. | |
| 5,962,856 A | 10/1999 | Zhao et al. | |
| 5,966,108 A | 10/1999 | Ditzik | |
| 5,973,312 A | 10/1999 | Curling et al. | |
| 5,990,980 A | 11/1999 | Golin | |

(56) References Cited

U.S. PATENT DOCUMENTS

| | | |
|---|---|---|
| 5,990,988 A | 11/1999 | Hanihara et al. |
| 5,995,172 A | 11/1999 | Ikeda et al. |
| 6,020,590 A | 2/2000 | Aggas et al. |
| 6,020,945 A | 2/2000 | Sawai et al. |
| 6,023,307 A | 2/2000 | Park |
| 6,028,581 A | 2/2000 | Umeya |
| 6,049,428 A | 4/2000 | Khan et al. |
| 6,061,177 A | 5/2000 | Fujimoto |
| 6,067,062 A | 5/2000 | Takasu et al. |
| 6,067,140 A | 5/2000 | Woo et al. |
| 6,069,393 A | 5/2000 | Hatanaka et al. |
| 6,078,378 A | 6/2000 | Lu et al. |
| 6,087,599 A | 7/2000 | Knowles |
| 6,100,538 A | 8/2000 | Ogawa |
| 6,118,435 A | 9/2000 | Fujita et al. |
| 6,133,906 A | 10/2000 | Geaghan |
| 6,163,313 A | 12/2000 | Aroyan et al. |
| 6,177,302 B1 | 1/2001 | Yamazaki et al. |
| 6,181,394 B1 | 1/2001 | Sanelle et al. |
| 6,182,892 B1 | 2/2001 | Angelo et al. |
| 6,184,863 B1 | 2/2001 | Sibert et al. |
| 6,188,781 B1 | 2/2001 | Brownlee |
| 6,232,607 B1 | 5/2001 | Huang |
| 6,236,053 B1 | 5/2001 | Shariv |
| 6,236,063 B1 | 5/2001 | Yamazaki et al. |
| 6,242,729 B1 | 6/2001 | Izumi et al. |
| 6,262,408 B1 | 7/2001 | Izumi et al. |
| 6,265,792 B1 | 7/2001 | Granchukoff |
| 6,271,813 B1 | 8/2001 | Palalau |
| 6,278,423 B1 | 8/2001 | Wald et al. |
| 6,278,444 B1 | 8/2001 | Wilson et al. |
| 6,284,558 B1 | 9/2001 | Sakamoto |
| 6,295,113 B1 | 9/2001 | Yang |
| 6,300,977 B1 | 10/2001 | Waechter |
| 6,316,790 B1 | 11/2001 | Kodaira et al. |
| 6,320,617 B1 | 11/2001 | Gee et al. |
| 6,323,490 B1 | 11/2001 | Ikeda et al. |
| 6,327,376 B1 | 12/2001 | Harkin |
| 6,333,544 B1 | 12/2001 | Toyoda et al. |
| 6,351,076 B1 | 2/2002 | Yoshida et al. |
| 6,351,260 B1 | 2/2002 | Graham et al. |
| 6,357,939 B1 | 3/2002 | Baron |
| 6,364,829 B1 | 4/2002 | Fulghum |
| 6,377,249 B1 | 4/2002 | Mumford |
| 6,380,995 B1 | 4/2002 | Kim |
| 6,392,254 B1 | 5/2002 | Liu et al. |
| 6,399,166 B1 | 6/2002 | Khan et al. |
| 6,441,362 B1 | 8/2002 | Ogawa |
| 6,453,008 B1 | 9/2002 | Sakaguchi et al. |
| 6,462,328 B2 | 10/2002 | Toyoda et al. |
| 6,465,824 B1 | 10/2002 | Kwasnick et al. |
| 6,476,447 B1 | 11/2002 | Yamazaki et al. |
| 6,489,631 B2 | 12/2002 | Young et al. |
| 6,495,387 B2 | 12/2002 | French |
| 6,504,530 B1 | 1/2003 | Wilson et al. |
| 6,518,561 B1 | 2/2003 | Miura |
| 6,521,109 B1 | 2/2003 | Bartic et al. |
| 6,529,189 B1 | 3/2003 | Colgan et al. |
| 6,552,745 B1 | 4/2003 | Perner |
| 6,597,348 B1 | 7/2003 | Yamazaki et al. |
| 6,603,867 B1 | 8/2003 | Sugino et al. |
| 6,646,636 B1 | 11/2003 | Popovich et al. |
| 6,667,740 B2 | 12/2003 | Ely et al. |
| 6,679,702 B1 | 1/2004 | Rau |
| 6,681,034 B1 | 1/2004 | Russo |
| 6,700,144 B2 | 3/2004 | Shimazaki et al. |
| 6,720,594 B2 | 4/2004 | Rahn et al. |
| 6,738,031 B2 | 5/2004 | Young et al. |
| 6,741,655 B1 | 5/2004 | Chang et al. |
| 6,762,741 B2 | 7/2004 | Weindorf |
| 6,803,906 B1 | 10/2004 | Morrison et al. |
| 6,815,716 B2 | 11/2004 | Sanson et al. |
| 6,831,710 B2 | 12/2004 | den Boer |
| 6,862,022 B2 | 3/2005 | Slupe |
| 6,864,882 B2 * | 3/2005 | Newton ................ 345/173 |
| 6,879,344 B1 * | 4/2005 | Nakamura et al. ............ 348/362 |
| 6,879,710 B1 | 4/2005 | Hinoue et al. |
| 6,888,528 B2 | 5/2005 | Rai et al. |
| 6,947,017 B1 | 9/2005 | Gettemy |
| 6,947,102 B2 | 9/2005 | den Boer et al. |
| 6,972,753 B1 | 12/2005 | Kimura et al. |
| 6,995,743 B2 | 2/2006 | den Boer et al. |
| 7,006,080 B2 * | 2/2006 | Gettemy ................ 345/175 |
| 7,009,663 B2 | 3/2006 | Abileah et al. |
| 7,023,503 B2 | 4/2006 | den Boer |
| 7,053,967 B2 | 5/2006 | Abileah et al. |
| 7,068,254 B2 | 6/2006 | Yamazaki et al. |
| 7,098,894 B2 | 8/2006 | Yang et al. |
| 7,109,465 B2 | 9/2006 | Kok et al. |
| 7,157,649 B2 | 1/2007 | Hill |
| 7,164,164 B2 | 1/2007 | Nakamura et al. |
| 7,176,905 B2 | 2/2007 | Baharav et al. |
| 7,177,026 B2 | 2/2007 | Perlin |
| 7,184,009 B2 | 2/2007 | Bergquist |
| 7,190,461 B2 | 3/2007 | Han et al. |
| 7,205,988 B2 | 4/2007 | Nakamura et al. |
| 7,208,102 B2 | 4/2007 | Aoki et al. |
| 7,242,049 B2 | 7/2007 | Forbes et al. |
| 7,250,596 B2 * | 7/2007 | Reime ................ 250/221 |
| 7,298,367 B2 | 11/2007 | Geaghan et al. |
| 7,348,946 B2 | 3/2008 | Booth, Jr. et al. |
| 7,408,598 B2 | 8/2008 | den Boer et al. |
| 7,418,117 B2 | 8/2008 | Kim et al. |
| 7,450,105 B2 | 11/2008 | Nakamura et al. |
| 7,456,812 B2 | 11/2008 | Smith et al. |
| 7,463,297 B2 | 12/2008 | Yoshida et al. |
| 7,483,005 B2 | 1/2009 | Nakamura et al. |
| 7,522,149 B2 | 4/2009 | Nakamura et al. |
| 7,535,468 B2 | 5/2009 | Uy |
| 7,536,557 B2 | 5/2009 | Murakami et al. |
| 7,545,371 B2 | 6/2009 | Nakamura et al. |
| 7,598,949 B2 | 10/2009 | Han |
| 7,629,945 B2 | 12/2009 | Baudisch |
| 7,649,527 B2 | 1/2010 | Cho et al. |
| 7,859,519 B2 | 12/2010 | Tulbert |
| 7,924,272 B2 | 4/2011 | der Boer et al. |
| 2001/0000676 A1 | 5/2001 | Zhang et al. |
| 2001/0003711 A1 | 6/2001 | Coyer |
| 2001/0044858 A1 | 11/2001 | Rekimoto et al. |
| 2001/0046013 A1 | 11/2001 | Noritake et al. |
| 2001/0052597 A1 | 12/2001 | Young et al. |
| 2001/0055008 A1 | 12/2001 | Young et al. |
| 2002/0027164 A1 | 3/2002 | Mault et al. |
| 2002/0030581 A1 | 3/2002 | Janiak et al. |
| 2002/0030768 A1 | 3/2002 | Wu |
| 2002/0052192 A1 | 5/2002 | Yamazaki et al. |
| 2002/0063518 A1 | 5/2002 | Okamoto et al. |
| 2002/0067845 A1 | 6/2002 | Griffis |
| 2002/0071074 A1 | 6/2002 | Noritake et al. |
| 2002/0074549 A1 | 6/2002 | Park et al. |
| 2002/0080123 A1 | 6/2002 | Kennedy et al. |
| 2002/0080263 A1 * | 6/2002 | Krymski ................ 348/364 |
| 2002/0126240 A1 | 9/2002 | Seiki et al. |
| 2002/0149571 A1 | 10/2002 | Roberts |
| 2003/0020083 A1 | 1/2003 | Hsiung et al. |
| 2003/0038778 A1 | 2/2003 | Noguera |
| 2003/0103030 A1 | 6/2003 | Wu |
| 2003/0117369 A1 | 6/2003 | Spitzer et al. |
| 2003/0127672 A1 | 7/2003 | Rahn et al. |
| 2003/0137494 A1 | 7/2003 | Tulbert |
| 2003/0151569 A1 | 8/2003 | Lee et al. |
| 2003/0156087 A1 | 8/2003 | den Boer et al. |
| 2003/0156100 A1 | 8/2003 | Gettemy |
| 2003/0156230 A1 | 8/2003 | den Boer et al. |
| 2003/0174256 A1 | 9/2003 | Kim et al. |
| 2003/0174870 A1 | 9/2003 | Kim et al. |
| 2003/0179323 A1 | 9/2003 | Abileah et al. |
| 2003/0183019 A1 | 10/2003 | Chae |
| 2003/0205662 A1 | 11/2003 | den Boer et al. |
| 2003/0218116 A1 | 11/2003 | den Boer et al. |
| 2003/0231277 A1 | 12/2003 | Zhang |
| 2003/0234759 A1 | 12/2003 | Bergquist |
| 2004/0046900 A1 | 3/2004 | den Boer et al. |
| 2004/0113877 A1 | 6/2004 | Abileah et al. |

(56) References Cited

U.S. PATENT DOCUMENTS

| | | |
|---|---|---|
| 2004/0125430 A1 | 7/2004 | Kasajima et al. |
| 2004/0191976 A1 | 9/2004 | Udupa et al. |
| 2004/0252867 A1* | 12/2004 | Lan et al. ............ 382/124 |
| 2005/0040393 A1 | 2/2005 | Hong |
| 2005/0110777 A1 | 5/2005 | Geaghan et al. |
| 2005/0117079 A1 | 6/2005 | Pak et al. |
| 2005/0134749 A1 | 6/2005 | Abileah |
| 2005/0146517 A1 | 7/2005 | Robrecht et al. |
| 2005/0173703 A1 | 8/2005 | Lebrun |
| 2005/0179706 A1 | 8/2005 | Childers |
| 2005/0200603 A1 | 9/2005 | Casebolt et al. |
| 2005/0206764 A1 | 9/2005 | Kobayashi et al. |
| 2005/0231656 A1 | 10/2005 | den Boer et al. |
| 2005/0270590 A1 | 12/2005 | Izumi et al. |
| 2005/0285985 A1 | 12/2005 | den Boer et al. |
| 2006/0007224 A1 | 1/2006 | Hayashi et al. |
| 2006/0007336 A1 | 1/2006 | Yamaguchi |
| 2006/0010658 A1 | 1/2006 | Bigley |
| 2006/0034492 A1 | 2/2006 | Siegel et al. |
| 2006/0120013 A1 | 6/2006 | Diorio et al. |
| 2006/0125971 A1 | 6/2006 | Abileah et al. |
| 2006/0170658 A1 | 8/2006 | Nakamura et al. |
| 2006/0176288 A1 | 8/2006 | Pittel et al. |
| 2006/0187367 A1 | 8/2006 | Abileah et al. |
| 2006/0202975 A1 | 9/2006 | Chiang |
| 2006/0249763 A1 | 11/2006 | Mochizuki et al. |
| 2006/0250381 A1 | 11/2006 | Geaghan |
| 2006/0279690 A1 | 12/2006 | Yu et al. |
| 2007/0030258 A1 | 2/2007 | Pittel et al. |
| 2007/0109239 A1 | 5/2007 | den Boer et al. |
| 2007/0109286 A1 | 5/2007 | Nakamura et al. |
| 2007/0131991 A1 | 6/2007 | Sugawa |
| 2007/0216905 A1 | 9/2007 | Han et al. |
| 2007/0279346 A1 | 12/2007 | den Boer et al. |
| 2008/0029691 A1 | 2/2008 | Han |
| 2008/0048995 A1 | 2/2008 | Abileah et al. |
| 2008/0049153 A1 | 2/2008 | Abileah et al. |
| 2008/0049154 A1 | 2/2008 | Abileah et al. |
| 2008/0055295 A1 | 3/2008 | den Boer et al. |
| 2008/0055496 A1 | 3/2008 | Abileah et al. |
| 2008/0055497 A1 | 3/2008 | Abileah et al. |
| 2008/0055498 A1 | 3/2008 | Abileah et al. |
| 2008/0055499 A1 | 3/2008 | den Boer et al. |
| 2008/0055507 A1 | 3/2008 | den Boer et al. |
| 2008/0062156 A1 | 3/2008 | Abileah et al. |
| 2008/0062157 A1 | 3/2008 | Abileah et al. |
| 2008/0062343 A1 | 3/2008 | den Boer et al. |
| 2008/0066972 A1 | 3/2008 | Abileah et al. |
| 2008/0084374 A1 | 4/2008 | Abileah et al. |
| 2008/0111780 A1 | 5/2008 | Abileah et al. |
| 2008/0129909 A1 | 6/2008 | den Boer et al. |
| 2008/0129913 A1 | 6/2008 | den Boer et al. |
| 2008/0129914 A1 | 6/2008 | den Boer et al. |
| 2008/0158172 A1 | 7/2008 | Hotelling et al. |
| 2008/0165311 A1 | 7/2008 | Abileah et al. |
| 2008/0284925 A1 | 11/2008 | Han |
| 2008/0297487 A1 | 12/2008 | Hotelling et al. |
| 2009/0167728 A1 | 7/2009 | Geaghan et al. |
| 2009/0225210 A1 | 9/2009 | Sugawa |
| 2010/0001978 A1 | 1/2010 | Lynch et al. |
| 2010/0013793 A1 | 1/2010 | Abileah et al. |
| 2010/0013796 A1 | 1/2010 | Abileah et al. |
| 2010/0020044 A1 | 1/2010 | Abileah et al. |
| 2010/0059296 A9 | 3/2010 | Abileah et al. |
| 2010/0302419 A1 | 12/2010 | den Boer et al. |
| 2011/0169771 A1 | 7/2011 | Fujioka et al. |
| 2011/0304592 A1 | 12/2011 | Booth et al. |
| 2013/0092941 A1 | 4/2013 | Den Boer et al. |

FOREIGN PATENT DOCUMENTS

| | | |
|---|---|---|
| EP | 0306596 A2 | 3/1989 |
| EP | 0 366 913 | 5/1990 |
| EP | 0 384 509 | 8/1990 |
| EP | 0 426 362 | 5/1991 |
| EP | 0 426 469 | 5/1991 |
| EP | 0 464 908 | 1/1992 |
| EP | 0 488 455 | 6/1992 |
| EP | 0 490 683 | 6/1992 |
| EP | 0 491 436 | 6/1992 |
| EP | 0 509 589 | 10/1992 |
| EP | 0 545 709 | 6/1993 |
| EP | 0 572 009 | 12/1993 |
| EP | 0 572 182 | 12/1993 |
| EP | 0 587 236 | 3/1994 |
| EP | 0 601 837 | 6/1994 |
| EP | 0 618 527 | 10/1994 |
| EP | 0 633 542 | 1/1995 |
| EP | 0 770 971 | 5/1997 |
| EP | 1022675 A2 | 7/2000 |
| EP | 1128170 A | 8/2001 |
| JP | 55-74635 | 6/1980 |
| JP | 57-203129 | 12/1982 |
| JP | 60-179823 | 9/1985 |
| JP | 64-6927 | 1/1989 |
| JP | 64-40004 | 2/1989 |
| JP | 1-196620 | 8/1989 |
| JP | 11-096620 | 8/1989 |
| JP | 2-182581 | 7/1990 |
| JP | 2-211421 | 8/1990 |
| JP | 5-019233 | 1/1993 |
| JP | 5-173707 | 7/1993 |
| JP | 5-243547 | 9/1993 |
| JP | 8-166849 | 6/1996 |
| JP | 9-1279 | 1/1997 |
| JP | 9-185457 | 7/1997 |
| JP | 9-231002 | 9/1997 |
| JP | 9-274537 | 10/1997 |
| JP | 10-027068 | 1/1998 |
| JP | 10-040004 | 2/1998 |
| JP | 10-133817 | 5/1998 |
| JP | 10-133819 | 5/1998 |
| JP | 10-186136 | 7/1998 |
| JP | 10-198515 | 7/1998 |
| JP | 11-110110 | 4/1999 |
| JP | 11-242562 | 9/1999 |
| JP | 2000-020241 | 1/2000 |
| JP | 2005-129948 | 5/2005 |
| JP | 2005-352490 | 12/2005 |
| WO | WO-99/21160 | 4/1999 |
| WO | WO-01/45283 A1 * | 6/2001 ............ H04B 1/38 |
| WO | WO-2006/104214 | 10/2006 |
| WO | WO-2007/145346 | 12/2007 |
| WO | WO-2007/145347 | 12/2007 |
| WO | WO-2008/018201 | 2/2008 |
| WO | WO-2008/044368 | 4/2008 |
| WO | WO-2008/044369 | 4/2008 |
| WO | WO-2008/044370 | 4/2008 |
| WO | WO-2008/044371 | 4/2008 |
| WO | WO-2008/047677 | 4/2008 |
| WO | WO-2009/081810 | 7/2009 |

OTHER PUBLICATIONS

Kim et al., "Fingerprint Scanner Using a Si: H TFT-array," SID '00 Digest, May 14, 2000.
International Search Report for PCT/US03/03277, Nov. 11, 2003.
Top Touch-Screen Options, from the website of Industrial Technology (www.industrialtechnology.co.uk/2001/mar/touch.html) dated Oct. 29, 2001, 2 pages.
Y. Bobrov et al., (2002) "5.2 Manufacturing of a Thin-film LCD," Optiva, Inc., San Francisco, CA. 4 pages.
W. den Boer et al. (2003) "Active Matrix LCD with Integrated Optical Touch Screen"; SID'03 (Baltimore) p. 1494-1497.
A. Abileah et al. (2004) "Integrated optical Touch Panel in a 14.1" AMLCD"; SID'04 (Seattle) p. 1544-1547.
A. Abileah et al. (2006) "Optical Sensors Embedded within AMLCD panel: Design and Applications"; ADEAC'06, SID (Atlanta) p. 102-105.
A. Abileah et al. (2007) "Optical Sensors Embedded within AMLCD Panel: Design and Applications"; Siggraph-07, San Diego, 5 pages.
C. Brown et al. (2007) "A 2.6 inch VGA LCD with Optical Input

(56) References Cited

OTHER PUBLICATIONS

Function using a 1-Transistor Active-Pixel Sensor"; ISSCC 2007 (&7.2) p. 132-133, 592.
S. Hong et al. (2005) "Smart LCD using a-Si photo sensor"; IMID'05 Digest p. 280-283.
International Search Report mailed Apr. 14, 2003 directed to Int'l Application No. PCT/US02/25573; 2 pages.
IPRP and Written Opinion mailed Dec. 30, 2004, directed to Int'l Application No. PCT/US02/25573; 16 pages.
International Search Report mailed Jun. 16, 2003, directed to Int'l Application No. PCT/US03/05300; 2 pages.
IPRP and Written Opinion mailed Oct. 8, 2004, directed to Int'l Application No. PCT/US03/05300; 15 pages.
International Search Report mailed Sep. 21, 2007, directed to Int'l Application No. PCT/US06/43741; 1 page.
IPRP and Written Opinion mailed Sep. 21, 2007, directed to Int'l Application No. PCT/US06/43741; 4 pages.
U.S. Appl. No. 60/359,263, filed Feb. 20, 2002.
U.S. Appl. No. 60/383,040, filed May 23, 2002.
U.S. Appl. No. 60/736,708, filed Nov. 14, 2005.
U.S. Appl. No. 60/821,325, filed Aug. 3, 2006.
Abileah et al., U.S. Office Action mailed Nov. 23, 2009, directed to U.S. Appl. No. 11/407,545 (6 pages).
den Boer, U.S. Office Action mailed Oct. 31, 2007, directed to U.S. Appl. No. 10/217,798 (10 pages).
den Boer, U.S. Office Action mailed Jun. 29, 2007, directed to U.S. Appl. No. 10/217,798 (11 pages).
den Boer, U.S. Office Action mailed May 12, 2006, directed to U.S. Appl. No. 10/217,798 (8 pages).
den Boer, U.S. Office Action mailed Jan. 13, 2006, directed to U.S. Appl. No. 10/217,798 (9 pages).
den Boer, U.S. Office Action mailed Aug. 23, 2005, directed to U.S. Appl. No. 10/217,798 (10 pages).
den Boer, U.S. Office Action mailed Dec. 10, 2004, directed to U.S. Appl. No. 10/217,798 (10 pages).
den Boer, U.S. Office Action mailed Mar. 4, 2004, directed to U.S. Appl. No. 10/217,798 (17 pages).
den Boer, U.S. Office Action mailed Jun. 4, 2003, directed to U.S. Appl. No. 10/217,798 (17 pages).
den Boer, U.S. Office Action mailed Nov. 26, 2004, directed to U.S. Appl. No. 10/307,106 (9 pages).
den Boer, U.S. Office Action mailed Jan. 21, 2005, directed to U.S. Appl. No. 10/329,217 (13 pages).
den Boer, U.S. Office Action mailed May 21, 2004, directed to U.S. Appl. No. 10/329,217 (14 pages).
den Boer et al, U.S. Office Action mailed Feb. 25, 2008 directed to U.S. Appl. No. 11/137,753 (16 pages).
den Boer et al, U.S. Office Action mailed May 23, 2007 directed to U.S. Appl. No. 11/137,753 (12 pages).
Abileah et al., U.S. Office Action mailed Aug. 9, 2005, directed to U.S. Appl. No. 10/442,433 (13 pages).
Abileah et al., U.S. Office Action mailed Sep. 21, 2004, directed to U.S. Appl. No. 10/442,433 (7 pages).
Abileah et al., U.S. Office Action mailed Aug. 28, 2006, directed to U.S. Appl. No. 10/371,413 (7 pages).
Abileah et al., U.S. Office Action mailed Dec. 13, 2005, directed to U.S. Appl. No. 10/371,413 (7 pages).
Abileah et al., U.S. Office Action mailed Apr. 15, 2005, directed to U.S. Appl. No. 10/371,413 (5 pages).
Abileah et al., U.S. Office Action mailed Jul. 12, 2005, directed to U.S. Appl. No. 10/347,149 (4 pages).
Abileah et al., U.S. Office Action mailed Jan. 21, 2005, directed to U.S. Appl. No. 10/347,149 (10 pages).
Abileah et al., U.S. Office Action mailed Jun. 22, 2005, directed to U.S. Appl. No. 10/739,455 (11 pages).
Abileah et al., U.S. Office Action mailed Mar. 24, 2009, directed to U.S. Appl. No. 11/351,098 (11 pages).
Abileah et al., U.S. Office Action mailed Jun. 24, 2008, directed to U.S. Appl. No. 11/351,098 (12 pages).
Abileah et al., U.S. Office Action mailed Oct. 18, 2007, directed to U.S. Appl. No. 11/351,098 (6 pages).
Abileah et al., U.S. Office Action mailed Jun. 28, 2007, directed to U.S. Appl. No. 11/351,098 (13 pages).
den Boer et al., U.S. Office Action mailed Jun. 25, 2009, directed to U.S. Appl. No. 11/980,029 (10 pages).
Abileah et al., U.S. Office Action mailed Apr. 29, 2011, directed to U.S. Appl. No. 11/977,911; 20 pages.
Abileah et al., U.S. Office Action mailed May 18, 2011, directed towards U.S. Appl. No. 11/978,031; 17 pages.
Abileah et al., U.S. Office Action mailed Jul. 29, 2010, directed to U.S. Appl. No. 11/901,649; 22 pages.
Echtler et al., (Jan. 2010) "An LED-based Multitouch Sensor for LCD Screens," Cambridge, Massachusetts: ACM; 4 pages.
Rossiter et al., (2005) "A Novel Tactile Sensor Using a Matrix of LEDs Operating in Both Photoemitter and Photodetector Modes," IEEE: 994-997.
Anita Kis, "Tactile Sensing and Analogic Algorithms," Ph.D. Dissertation, Budapest 2006; 122 pages.
Abileah et al., U.S. Office Action mailed Feb. 10, 2011, directed to U.S. Appl. No. 11/901,649; 20 pages.
Abileah et al., U.S. Office Action mailed Jun. 21, 2011, directed to U.S. Appl. No. 11/977,339; 11 pages.
Abileah et al., U.S. Office Action mailed Jun. 24, 2011, directed to U.S. Appl. No. 11/978,006; 12 pages.
Abileah et al., U.S. Office Action mailed Jul. 5, 2011, directed to U.S. Appl. No. 11/977,279; 12 pages.
den Boer et al., U.S. Office Action mailed Jun. 28, 2011, directed to U.S. Appl. No. 12/852,883;16 pages.
den Boer et al., U.S. Office Action mailed Jun. 15, 2011, directed to U.S. Appl. No. 11/595,071; 9 pages.
den Boer et al., U.S. Office Action mailed Oct. 14, 2010, directed towards U.S. Appl. No. 11/595,071; 8 pages.
Abileah et al., U.S. Office Action mailed Nov. 26, 2010, directed to U.S. Appl. No. 11/977,830; 8 pages.
Abileah et al., U.S. Office Action mailed Nov. 26, 2010, directed to U.S. Appl. No. 11/977,279; 10 pages.
Abileah et al., U.S. Office Action mailed Oct. 13, 2010, directed towards U.S. Appl. No. 11/978,006; 9 pages.
Y. Bobrov et al. (2002) "5.2 Manufacturing of a Thin-film LCD," Optiva, Inc., San Francisco, CA, 4 pages.
Abileah et al., U.S. Office Action mailed Dec. 13, 2010, directed to U.S. Appl. No. 11/977,339; 9 pages.
Abileah et al., U.S. Office Action mailed Feb. 1, 2011, directed towards U.S. Appl. No. 11/978,031; 20 pages.
Abileah et al., Office Action mailed Jun. 19, 2012, directed to U.S. Appl. No. 11/977,864; 8 pages.
Abileah et al., U.S. Office Action mailed Jan. 10, 2012, directed to U.S. Appl. No. 11/977,864; 6 pages.
Abileah et al., U.S. Office Action mailed Nov. 17, 2011, directed to U.S. Appl. No. 11/977,339; 9 pages.
Notification of Reasons for Rejection mailed Dec. 19, 2011, directed to JP Application No. 2008-540205; 6 pages.
Abileah et al., U.S. Office Action mailed Feb. 29, 2012, directed towards U.S. Appl. No. 11/978,031; 20 pages.
Abileah et al., U.S. Office Action mailed Jan. 31, 2012, directed to U.S. Appl. No. 12/566,477; 11 pages.
Abileah et al., Office Action mailed Apr. 20, 2012, directed to U.S. Appl. No. 12/566,455; 9 pages.
den Boer et al., Office Action mailed Jun. 5, 2012, directed towards U.S. Appl. No. 11/595,071; 15 pages.
Abileah et al., U.S. Office Action mailed Oct. 25, 2012, directed towards U.S. Appl. No. 12/568,316; 16 pages.
Abileah et al., U.S. Office Action mailed Oct. 11, 2012, directed to U.S. Appl. No. 12/566,455; 8 pages.
Abileah et al., U.S. Office Action mailed Nov. 15, 2012, directed to U.S. Appl. No. 12/566,477; 12 pages.
Abileah et al., U.S. Office Action mailed Sep. 29, 2011, directed to U.S. Appl. No. 11/977,911; 23 pages.
Abileah et al., U.S. Office Action mailed Nov. 2, 2011, directed towards U.S. Appl. No. 12/568,316; 32 pages.
Notification of Reasons for Rejection mailed Sep. 24, 2013, directed to JP Application No. 2012-093530; 4 pages.

(56) References Cited

OTHER PUBLICATIONS

Abileah et al., U.S. Office Action mailed Mar. 1, 2013, directed to U.S. Appl. No. 11/977,864; 8 pages.
Abileah et al., U.S. Office Action mailed Mar. 14, 2014, directed to U.S. Appl. No. 11/977,339; 10 pages.
Abileah et al., U.S. Office Action mailed Jan. 3, 2013, directed to U.S. Appl. No. 11/978,031; 20 pages.
Abileah et al., U.S. Office Action mailed Feb. 27, 2014, directed to U.S. Appl. No. 11/977,279; 11 pages.
Abileah et al., U.S. Office Action mailed May 7, 2013, directed to U.S. Appl. No. 12/568,316; 14 pages.
Abileah et al., U.S. Office Action mailed Jan. 13, 2014, directed to U.S. Appl. No. 12/568,316; 15 pages.
Den Boer et al., U.S. Office Action mailed Sep. 18, 2013, directed to U.S. Appl. No. 13/652,007; 18 pages.
Den Boer et al., U.S. Office Action mailed Apr. 28, 2014, directed to U.S. Appl. No. 13/652,007; 16 pages.
Den Boer et al., U.S. Office Action mailed Jan. 11, 2013, directed to U.S. Appl. No. 11/595,071; 13 pages.

* cited by examiner

PhotoTFT
ReadoutTFT
Capacitor CST2

WHILE ERASER IS A FEW mm BELOW THE GLASS

WHILE ERASER IS IN CONTACT WITH GLASS

LIGHT SENSITIVE DISPLAY WITH MULTIPLE DATA SET OBJECT DETECTION

CROSS REFERENCE TO RELATED APPLICATIONS

This application is a continuation of U.S. patent application Ser. No. 11/901,649, filed Sep. 18, 2007, which is a continuation of U.S. patent application Ser. No. 10/371,413, filed Feb. 20, 2003, which claims the benefit of U.S. Provisional Application No. 60/383,040, filed May 23, 2002, and U.S. Provisional Application No. 60/359,263, filed Feb. 20, 2002, the entireties of which are incorporated herein by reference.

BACKGROUND

The present invention relates to touch sensitive displays.

Touch sensitive screens ("touch screens") are devices that typically mount over a display such as a cathode ray tube. With a touch screen, a user can select from options displayed on the display's viewing surface by touching the surface adjacent to the desired option, or, in some designs, touching the option directly. Common techniques employed in these devices for detecting the location of a touch include mechanical buttons, crossed beams of infrared light, acoustic surface waves, capacitance sensing, and resistive materials.

For example, Kasday, U.S. Pat. No. 4,484,179 discloses an optically-based touch screen comprising a flexible clear membrane supported above a glass screen whose edges are fitted with photodiodes. When the membrane is flexed into contact with the screen by a touch, light which previously would have passed through the membrane and glass screen is trapped between the screen surfaces by total internal reflection. This trapped light travels to the edge of the glass screen where it is detected by the photodiodes which produce a corresponding output signal. The touch position is determined by coordinating the position of the CRT raster beam with the timing of the output signals from the several photodiodes. The optically-based touch screen increases the expense of the display, and increases the complexity of the display.

Denlinger, U.S. Pat. No. 4,782,328 on the other hand, relies on reflection of ambient light from the actual touch source, such as a finger or pointer, into a pair of photosensors mounted at corners of the touch screen. By measuring the intensity of the reflected light received by each photosensor, a computer calculates the location of the touch source with reference to the screen. The inclusion of the photosensors and associated computer increases the expense of the display, and increases the complexity of the display.

May, U.S. Pat. No. 5,105,186, discloses a liquid crystal touch screen that includes an upper glass sheet and a lower glass sheet separated by spacers. Sandwiched between the glass sheets is a thin layer of liquid crystal material. The inner surface of each piece of glass is coated with a transparent, conductive layer of metal oxide. Affixed to the outer surface of the upper glass sheet is an upper polarizer which comprises the display's viewing surface. Affixed to the outer surface of glass sheet is a lower polarizer. Forming the back surface of the liquid crystal display is a transflector adjacent to the lower polarizer. A transflector transmits some of the light striking its surface and reflects some light. Adjacent to transflector is a light detecting array of light dependent resistors whose resistance varies with the intensity of light detected. The resistance increases as the light intensity decreases, such as occurs when a shadow is cast on the viewing surface. The light detecting array detects a change in the light transmitted through the transflector caused by a touching of viewing surface. Similar to touch sensitive structures affixed to the front of the liquid crystal stack, the light sensitive material affixed to the rear of the liquid crystal stack similarly pose potential problems limiting contrast of the display, increasing the expense of the display, and increasing the complexity of the display.

Touch screens that have a transparent surface which mounts between the user and the display's viewing surface have several drawbacks. For example, the transparent surface, and other layers between the liquid crystal material and the transparent surface may result in multiple reflections which decreases the display's contrast and produces glare. Moreover, adding an additional touch panel to the display increases the manufacturing expense of the display and increases the complexity of the display. Also, the incorporation of the touch screen reduces the overall manufacturing yield of the display.

Accordingly, what is desired is a touch screen that does not significantly decrease the contrast ratio, does not significantly increase the glare, does not significantly increase the expense of the display, and does not significantly increase the complexity of the display.

The foregoing and other objectives, features, and advantages of the invention will be more readily understood upon consideration of the following detailed description of the invention, taken in conjunction with the accompanying drawings.

DETAILED DESCRIPTION

Figure 1:
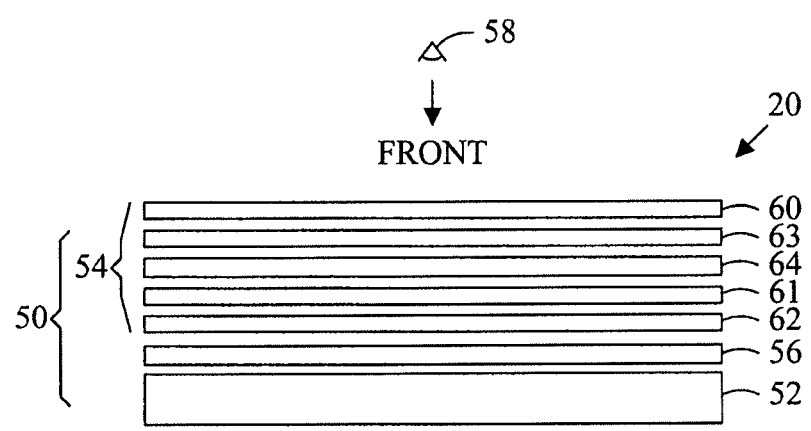
FIG. 1 is a cross sectional view of a traditional active matrix liquid crystal display.

Referring to FIG. 1, a liquid crystal display (LCD) 50 (indicated by a bracket) comprises generally, a backlight 52 and a light valve 54 (indicated by a bracket). Since liquid crystals do not emit light, most LCD panels are backlit with fluorescent tubes or arrays of light-emitting diodes (LEDs) that are built into the sides or back of the panel. To disperse the light and obtain a more uniform intensity over the surface of the display, light from the backlight 52 typically passes through a diffuser 56 before impinging on the light valve 54.

The transmittance of light from the backlight 52 to the eye of a viewer 58, observing an image displayed on the front of the panel, is controlled by the light valve 54. The light valve 54 normally includes a pair of polarizers 60 and 62 separated by a layer of liquid crystals 64 contained in a cell gap between glass or plastic plates, and the polarizers. Light from the backlight 52 impinging on the first polarizer 62 comprises electromagnetic waves vibrating in a plurality of planes. Only that portion of the light vibrating in the plane of the optical axis of the polarizer passes through the polarizer. In an LCD light valve, the optical axes of the first 62 and second 60 polarizer are typically arranged at an angle so that light passing through the first polarizer would normally be blocked from passing through the second polarizer in the series. However, the orientation of the translucent crystals in the layer of liquid crystals 64 can be locally controlled to either "twist" the vibratory plane of the light into alignment with the optical axes of the polarizer, permitting light to pass through the light valve creating a bright picture element or pixel, or out of alignment with the optical axis of one of the polarizers, attenuating the light and creating a darker area of the screen or pixel.

The surfaces of a first glass substrate 61 and a second glass substrate 63 form the walls of the cell gap and are buffed to produce microscopic grooves to physically align the molecules of liquid crystal 64 immediately adjacent to the walls. Molecular forces cause adjacent liquid crystal molecules to attempt to align with their neighbors with the result that the orientation of the molecules in the column of molecules spanning the cell gap twist over the length of the column. Likewise, the plane of vibration of light transiting the column of molecules will be "twisted" from the optical axis of the first polarizer 62 to a plane determined by the orientation of the liquid crystals at the opposite wall of the cell gap. If the wall of the cell gap is buffed to align adjacent crystals with the optical axis of the second polarizer, light from the backlight 52 can pass through the series of polarizers 60 and 62 to produce a lighted area of the display when viewed from the front of the panel (a "normally white" LCD).

To darken a pixel and create an image, a voltage, typically controlled by a thin film transistor, is applied to an electrode in an array of transparent electrodes deposited on the walls of the cell gap. The liquid crystal molecules adjacent to the electrode are attracted by the field produced by the voltage and rotate to align with the field. As the molecules of liquid crystal are rotated by the electric field, the column of crystals is "untwisted," and the optical axes of the crystals adjacent to the cell wall are rotated progressively out of alignment with the optical axis of the corresponding polarizer progressively reducing the local transmittance of the light valve 54 and attenuating the luminance of the corresponding pixel. In other words, in a normally white twisted nematic device there are generally two modes of operation, one without a voltage applied to the molecules and one with a voltage applied to the molecules. With a voltage applied (e.g., driven mode) to the molecules the molecules rotate their polarization axis which results in inhibiting the passage of light to the viewer. Similarly, without a voltage applied (e.g., non-driven mode) the polarization axis is not rotated so that the passage of light is not inhibited to the viewer.

Conversely, the polarizers and buffing of the light valve can be arranged to produce a "normally black" LCD having pixels that are dark (light is blocked) when the electrodes are not energized and light when the electrodes are energized. Color LCD displays are created by varying the intensity of transmitted light for each of a plurality of primary color (typically, red, green, and blue) sub-pixels that make up a displayed pixel.

The aforementioned example was described with respect to a twisted nematic device. However, this description is only an example and other devices may likewise be used, including but not limited to, multi-domain vertical alignment, patterned vertical alignment, in-plane switching, and super-twisted nematic type LCDs. In addition other devices, such as for example, plasma displays, organic displays, active matrix organic light emitting display, electroluminescent displays, liquid crystal on silicon displays, reflective liquid crystal devices may likewise be used. For such displays the light emitting portion of the display, or portion of the display that permits the display of selected portions of light may be considered to selectively cause the pixels to provide light.

For an active matrix LCD (AMLCD) the inner surface of the second glass substrate 63 is normally coated with a continuous electrode while the first glass substrate 61 is patterned into individual pixel electrodes. The continuous electrode may be constructed using a transparent electrode, such as indium tin oxide. The first glass substrate 61 may include thin film transistors (TFTs) which act as individual switches for each pixel electrode (or group of pixel electrodes) corresponding to a pixel (or group of pixels). The TFTs are addressed by a set of multiplexed electrodes running along the gaps between the pixel electrodes. Alternatively the pixel electrodes may be on a different layer from the TFTs. A pixel is addressed by applying voltage (or current) to a selected line, which switches the TFT on and allows charge from the data line to flow onto the rear pixel electrodes. The combination of voltages between the front electrode and the pixel electrodes sets up a voltage across the pixels and turns the respective pixels on. The thin-film transistors are typically constructed from amorphous silicon, while other types of switching devices may likewise be used, such as for example, metal-insulator-metal diode and polysilicon thin-film transistors. The TFT array and pixel electrodes may alternatively be on the top of the liquid crystal material. Also, the continuous electrode may be patterned or portions selectively selected, as desired. Also the light sensitive elements may likewise be located on the top, or otherwise above, of the liquid crystal material, if desired.

Figure 2:
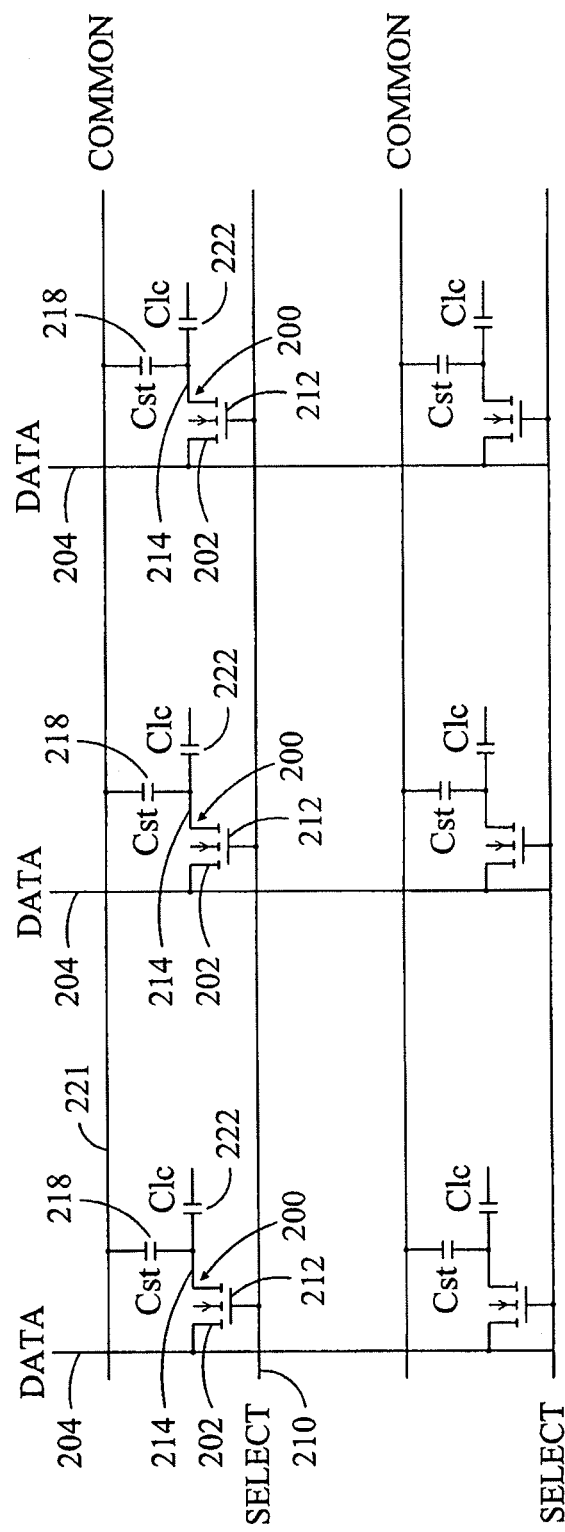
FIG. 2 is a schematic of the thin film transistor array.

Referring to FIG. 2, the active matrix layer may include a set of data lines and a set of select lines. Normally one data line is included for each column of pixels across the display and one select line is included for each row of pixels down the display, thereby creating an array of conductive lines. To load the data to the respective pixels indicating which pixels should be illuminated, normally in a row-by-row manner, a set of voltages are imposed on the respective data lines 204 which imposes a voltage on the sources 202 of latching transistors 200. The selection of a respective select line 210, interconnected to the gates 212 of the respective latching transistors 200, permits the voltage imposed on the sources 202 to be passed to the drain 214 of the latching transistors 200. The drains 214 of the latching transistors 200 are electrically connected to respective pixel electrodes and are capacitively coupled to a respective common line 221 through a respective Cst capacitor 218. In addition, a respective capacitance exists between the pixel electrodes enclosing the liquid crystal material, noted as capacitances Clc 222 (between the pixel electrodes and the common electrode on the color plate). The common line 221 provides a voltage reference. In other words, the voltage data (representative of the image to be displayed) is loaded into the data lines for a row of latching transistors 200 and imposing a voltage on the select line 210 latches that data into the holding capacitors and hence the pixel electrodes. Alternatively, the display may be operated based upon current levels.

Figure 3:
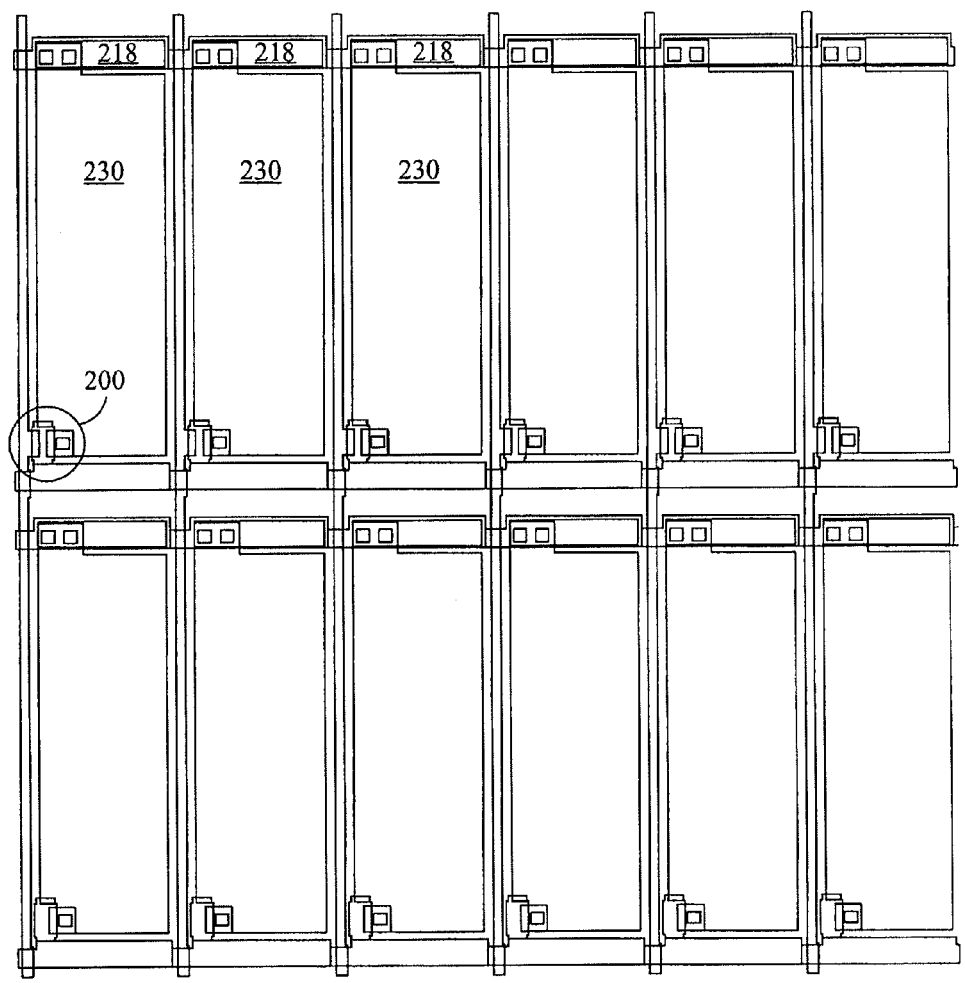
FIG. 3 is a layout of the thin film transistor array of FIG. 2.

Referring to FIG. 3, a schematic layout is shown of the active matrix layer. The pixel electrodes 230 are generally grouped into a "single" effective pixel so that a corresponding set of pixel electrodes 230 may be associated with respective color filters (e.g., red, green, blue). The latching transistors 200 interconnect the respective pixel electrodes 230 with the data lines and the select line. The pixel electrodes 230 may be interconnected to the common line 221 by the capacitors Cst 218. The pixels may include any desirable shape, any number of sub-pixels, and any set of color filters.

Figures 4A, 4B, 4C, 4D, 4E, 4F, 4G, 4H:
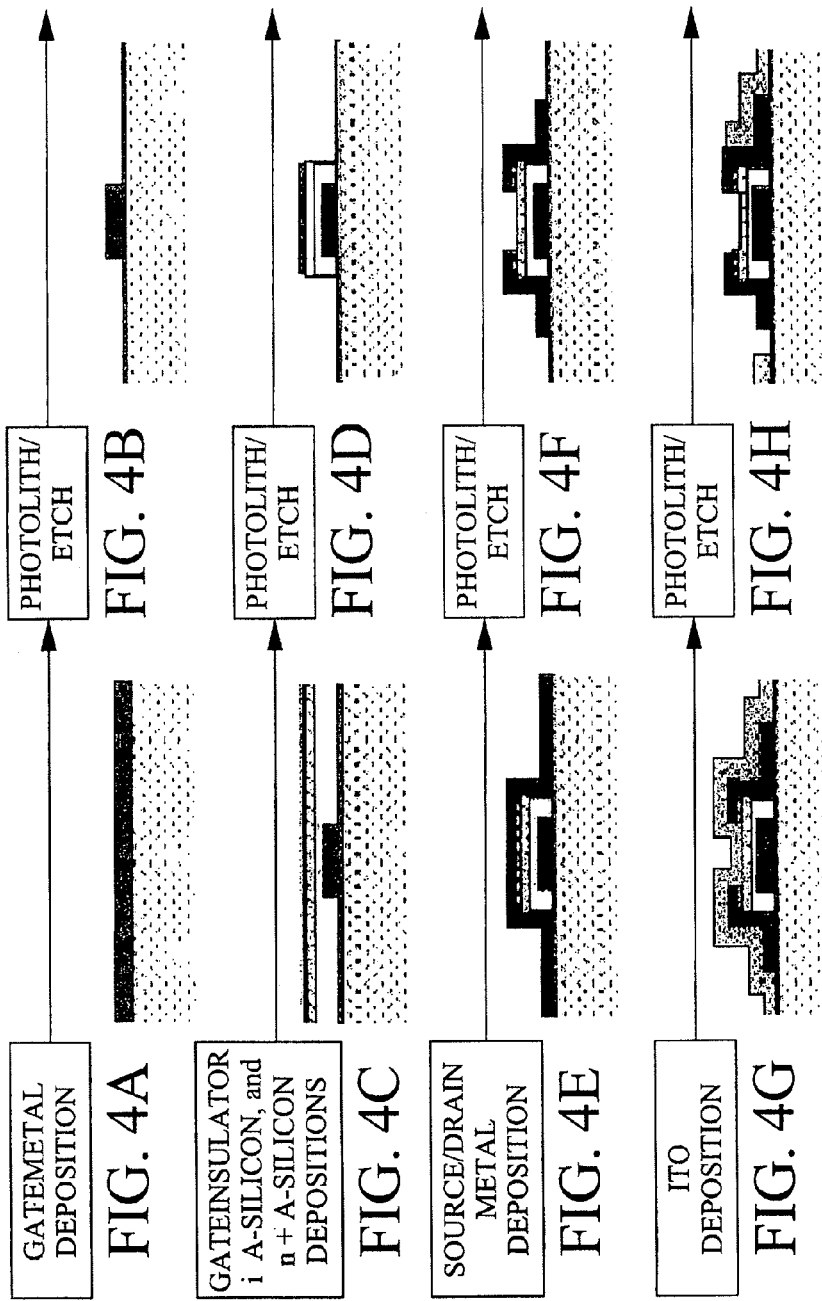
FIGS. 4A-4H is a set of steps suitable for constructing pixel electrodes and amorphous silicon thin-film transistors.

Referring to FIG. 4, the active matrix layer may be constructed using an amorphous silicon thin-film transistor fabrication process. The steps may include gate metal deposition (FIG. 4A), a photolithography/etch (FIG. 4B), a gate insulator and amorphous silicon deposition (FIG. 4C), a photolithography/etch (FIG. 4D), a source/drain metal deposition (FIG. 4E), a photolithography/etch (FIG. 4F), an ITO deposition (FIG. 4G), and a photolithography/etch (FIG. 4H). Other processes may likewise be used, as desired.

The present inventors considered different potential architectural touch panel schemes to incorporate additional optical layers between the polarizer on the front of the liquid crystal display and the front of the display. These additional layers include, for example, glass plates, wire grids, transparent electrodes, plastic plates, spacers, and other materials. In addition, the present inventors considered the additional layers with different optical characteristics, such as for example, birefringence, non-birefringence, narrow range of wavelengths, wide range of wavelengths, etc. After an extensive analysis of different potential configurations of the touch screen portion added to the display together with materials having different optical properties and further being applied to the different types of technologies (e.g., mechanical switches, crossed beams of infrared light, acoustic surface waves, capacitance sensing, and resistive membranes), the present inventors determined that an optimized touch screen is merely a tradeoff between different undesirable properties. Accordingly, the design of an optimized touch screen is an ultimately unsolvable task. In contrast to designing an improved touch screen, the present inventors came to the realization that modification of the structure of the active matrix liquid crystal device itself could provide an improved touch screen capability without all of the attendant drawbacks to the touch screen configuration located on the front of the display.

Figure 5:
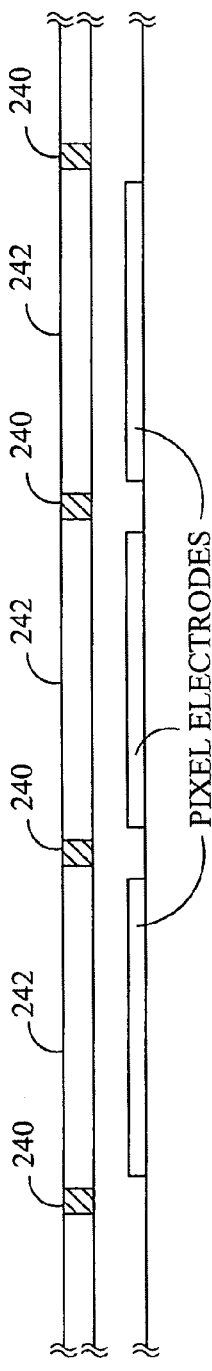
FIG. 5 illustrates pixel electrodes, color filters, and a black matrix.

Referring to FIG. 5, with particular attention to the latching transistors of the pixel electrodes, a black matrix 240 is overlying the latching transistors so that significant ambient light does not strike the transistors. Color filters 242 may be located above the pixel electrodes. Ambient light striking the latching transistors results in draining the charge imposed on the pixel electrodes through the transistor. The discharge of the charge imposed on the pixel electrodes results in a decrease in the operational characteristics of the display, frequently to the extent that the display is rendered effectively inoperative. With the realization that amorphous silicon transistors are sensitive to light incident thereon, the present inventors determined that such transistors within the active matrix layer may be used as a basis upon which to detect the existence of or non-existence of ambient light incident thereon (e.g., relative values thereto).

Figure 7:
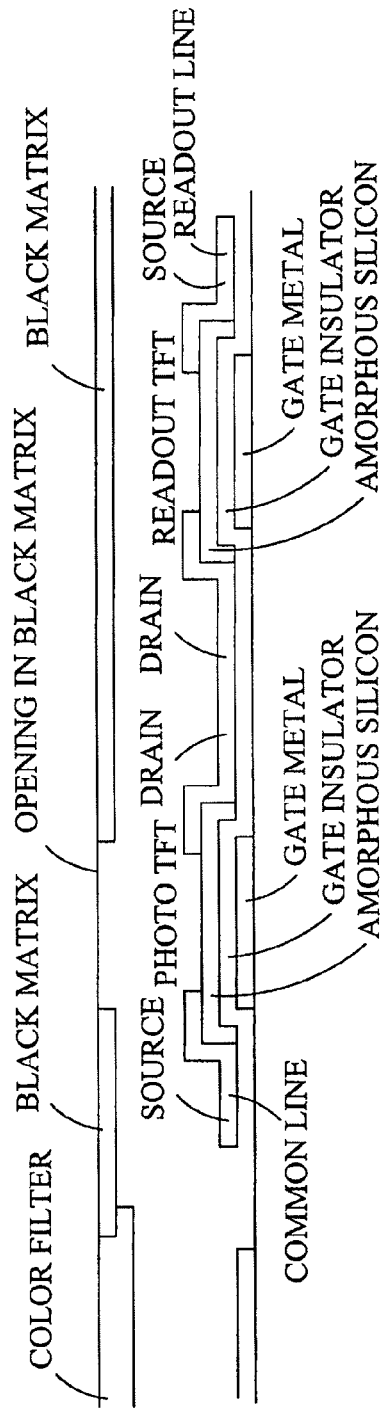
FIG. 7 illustrates a pixel electrode, photo TFT, readout TFT, and a black matrix.
Figure 6:
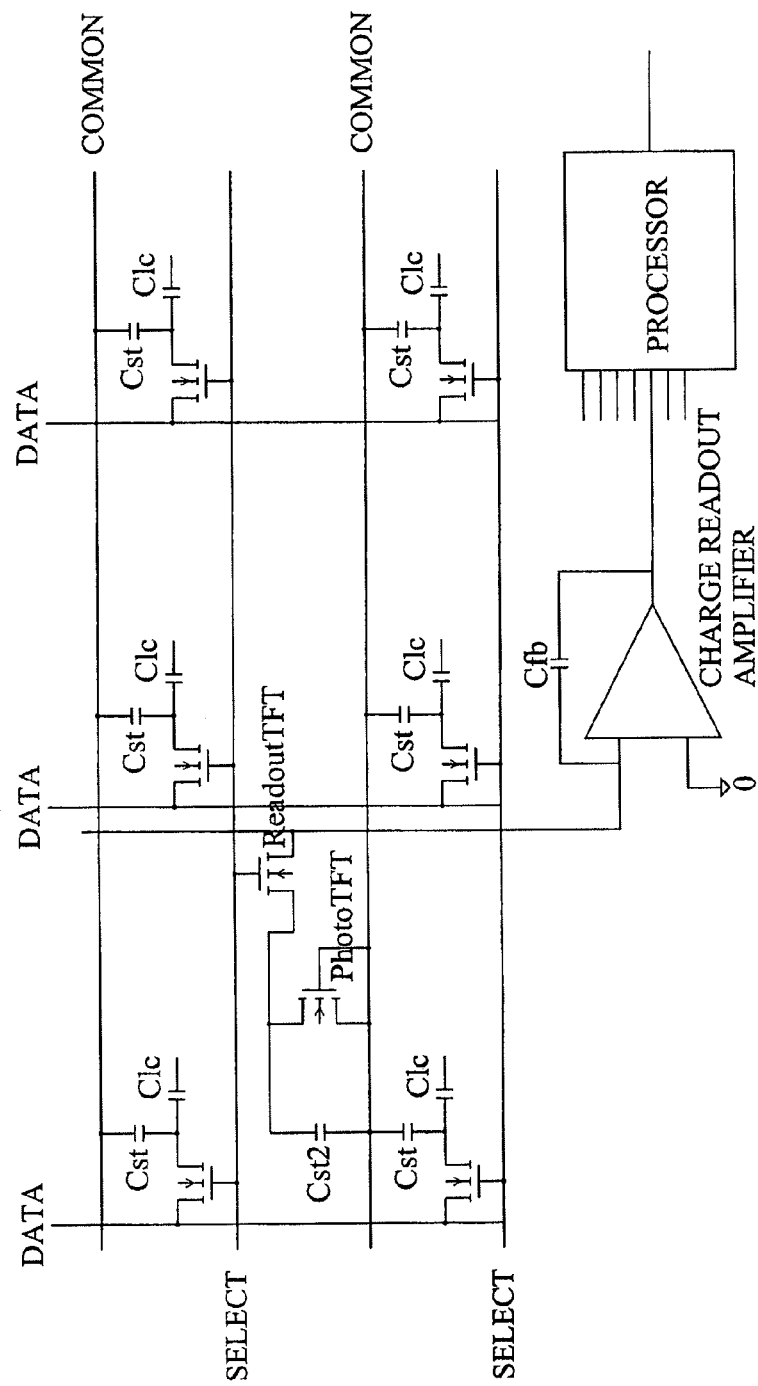
FIG. 6 illustrates a schematic of the active matrix elements, pixel electrode, photo TFT, readout TFT, and a black matrix.

Referring to FIG. 6, a modified active matrix layer may include a photo-sensitive structure or elements. The preferred photo-sensitive structure includes a photo-sensitive thin film transistor (photo TFT) interconnected to a readout thin film transistor (readout TFT). A capacitor Cst2 may interconnect the common line to the transistors. Referring to FIG. 7, a black matrix may be in an overlying relationship to the readout TFT. The black matrix is preferably an opaque material or otherwise the structure of the display selectively inhibiting the transmission of light to selective portions of the active matrix layer. Preferably the black matrix is completely overlying the amorphous silicon portion of the readout TFT, and at least partially overlying the amorphous silicon portion of the readout TFT. Preferably the black matrix is completely non-overlying the amorphous silicon portion of the photo TFT, and at least partially non-overlying the amorphous silicon portion of the photo TFT. Overlying does not necessarily denote direct contact between the layers, but is intended to denote in the general sense the stacked structure of materials. The black matrix is preferably fabricated on a layer other than the active plate, such as the color plate. The active plate is normally referred to as the plate supporting the thin-film transistors. The location of the black matrix on the color plate (or other non-active plate) results in limited additional processing or otherwise modification of the fabrication of the active matrix. In some embodiments, the black matrix inhibits ambient light from impacting the amorphous silicon portion of the readout TFT to an extent greater than inhibiting ambient light from impacting the amorphous silicon portion of the photo TFT. A gate metal, or other light inhibiting material, may inhibit the photo-sensitive elements from the back light.

Typically the photo-sensitive areas (channels of the transistors) are generally rectangular in shape, although other shapes may be used. The opening in the black matrix is preferably wider (or longer) than the corresponding channel area. In this manner the channel area and the opening in the black matrix are overlapping, with the opening extending in a first dimension (e.g., width) greater than the channel area and in a second dimension (e.g., length) less than the channel area. This alignment alleviates the need for precise registration of the layers while ensuring reasonable optical passage of light to the light sensitive element. Other relative sizes may likewise be used, as described.

As an example, the common line may be set at a negative voltage potential, such as −10 volts. During the previous readout cycle, a voltage is imposed on the select line which causes the voltage on the readout line to be coupled to the drain of the photo TFT and the drain of the readout TFT, which results in a voltage potential across Cst2. The voltage coupled to the drain of the photo TFT and the drain of the readout TFT is approximately ground (e.g., zero volts) with the non-inverting input of the operational amplifier connected to ground. The voltage imposed on the select line is removed so that the readout TFT will turn "off".

Under normal operational conditions ambient light from the front of the display passes through the black matrix and strikes the amorphous silicon of the photo TFT. However, if a person touches the front of the display in a region over the opening in the black matrix or otherwise inhibits the passage of light through the front of the display in a region over the opening in the black matrix, then the photo TFT transistor will be in an "off" state. If the photo TFT is "off" then the voltage across the capacitor Cst2 will not significantly discharge through the photo TFT. Accordingly, the charge imposed across Cst2 will be substantially unchanged. In essence, the voltage imposed across Cst2 will remain substantially unchanged if the ambient light is inhibited from striking the photo TFT.

To determine the voltage across the capacitor Cst2, a voltage is imposed on the select line which causes the gate of the readout TFT to interconnect the imposed voltage on Cst2 to the readout line. If the voltage imposed on the readout line as a result of activating the readout TFT is substantially unchanged, then the output of the operational amplifier will be substantially unchanged (e.g., zero). In this manner, the system is able to determine whether the light to the device has been inhibited, in which case the system will determine that the screen has been touched at the corresponding portion of the display with the photo TFT.

During the readout cycle, the voltage imposed on the select line causes the voltage on the respective drain of the photo TFT and the drain of the readout TFT to be coupled to the respective readout line, which results in resetting the voltage potential across Cst2. The voltage coupled to the drain of the photo TFT and the drain of the readout TFT is approximately ground (e.g., zero volts) with the non-inverting input of the operational amplifier connected to ground. The voltage imposed on the select line is removed so that the readout TFT will turn "off". In this manner, the act of reading the voltage simultaneously acts to reset the voltage potential for the next cycle.

Under normal operational conditions ambient light from the front of the display passes through the black matrix and strikes the amorphous silicon of the photo TFT. If a person does not touch the front of the display in a region over the opening in the black matrix or otherwise inhibits the passage of light through the front of the display in a region over the opening in the black matrix, then the photo TFT transistor will be in an "on" state. If the photo TFT is "on" then the voltage across the capacitor Cst2 will significantly discharge through the photo TFT, which is coupled to the common line. In essence the voltage imposed across Cst2 will decrease toward the common voltage. Accordingly, the charge imposed across Cst2 will be substantially changed in the presence of ambient light. Moreover, there is a substantial difference in the voltage potential across the hold capacitor when the light is not inhibited versus when the light is inhibited.

Similarly, to determine the voltage across the capacitor Cst2, a voltage is imposed on the select line which causes the gate of the readout TFT to interconnect the imposed voltage to the readout line. If the voltage imposed on the readout line as a result of activating the readout TFT is substantially changed or otherwise results in an injection of current, then the output of the operational amplifier will be substantially non-zero. The output voltage of the operational amplifier is proportional or otherwise associated with the charge on the capacitor Cst2. In this manner, the system is able to determine whether the light to the device has been uninhibited, in which case the system will determine that the screen has not been touched at the corresponding portion of the display with the photo TFT.

Figure 8:
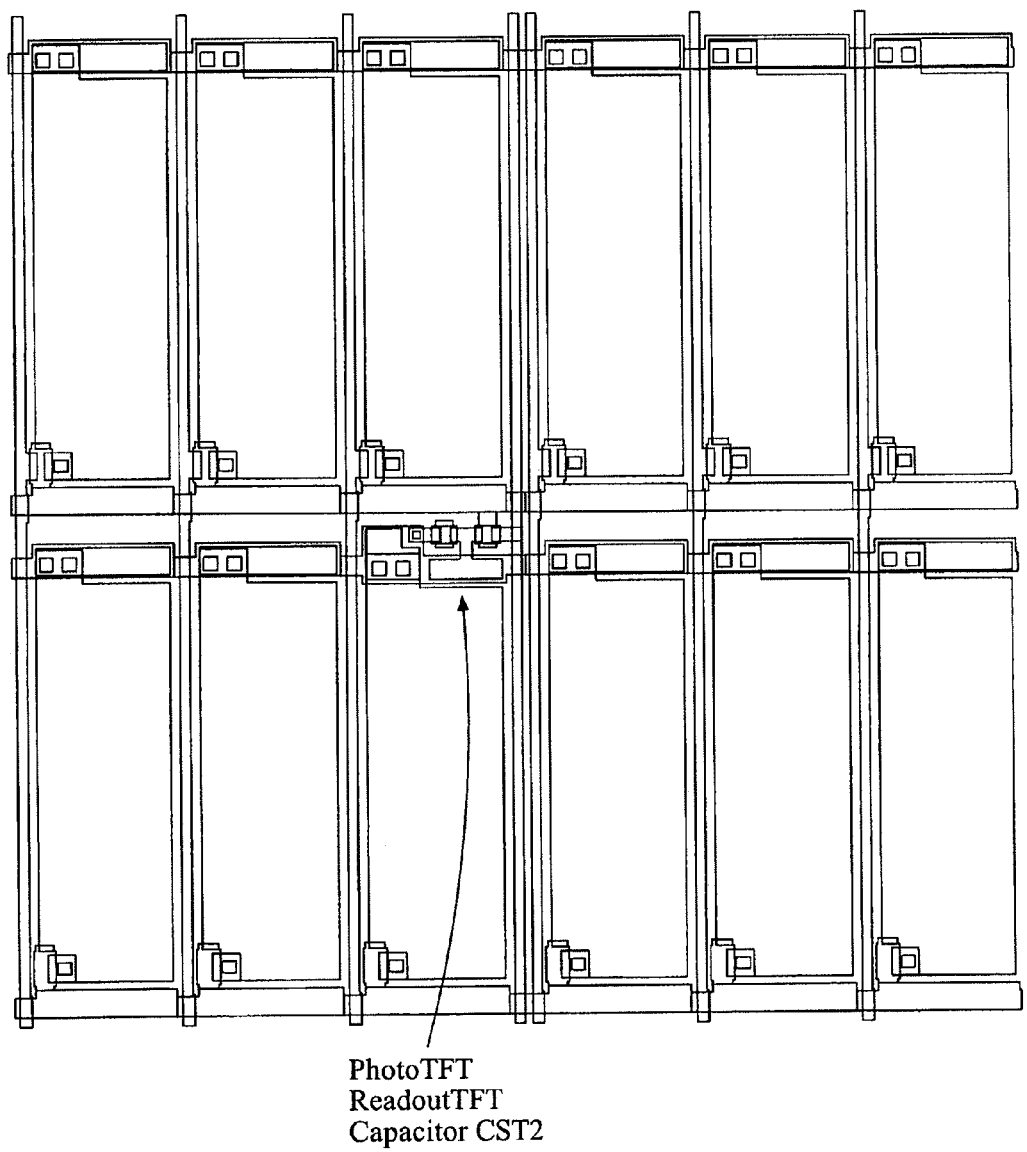
FIG. 8 is a layout of the thin film transistor array of FIGS. 6 and 7.

Referring to FIG. 8, a layout of the active matrix layer may include the photo TFT, the capacitor Cst2, and the readout TFT in a region between the pixel electrodes. Light sensitive elements are preferably included at selected intervals within the active matrix layer. In this manner, the device may include touch panel sensitivity without the need for additional touch panel layers attached to the front of the display. In addition, the additional photo TFT, readout TFT, and capacitor may be fabricated together with the remainder of the active matrix layer, without the need for specialized processing. Moreover, the complexity of the fabrication process is only slightly increased so that the resulting manufacturing yield will remain substantially unchanged. It is to be understood that other light sensitive elements may likewise be used. In addition, it is to be understood that other light sensitive electrical architectures may likewise be used.

Figure 11:
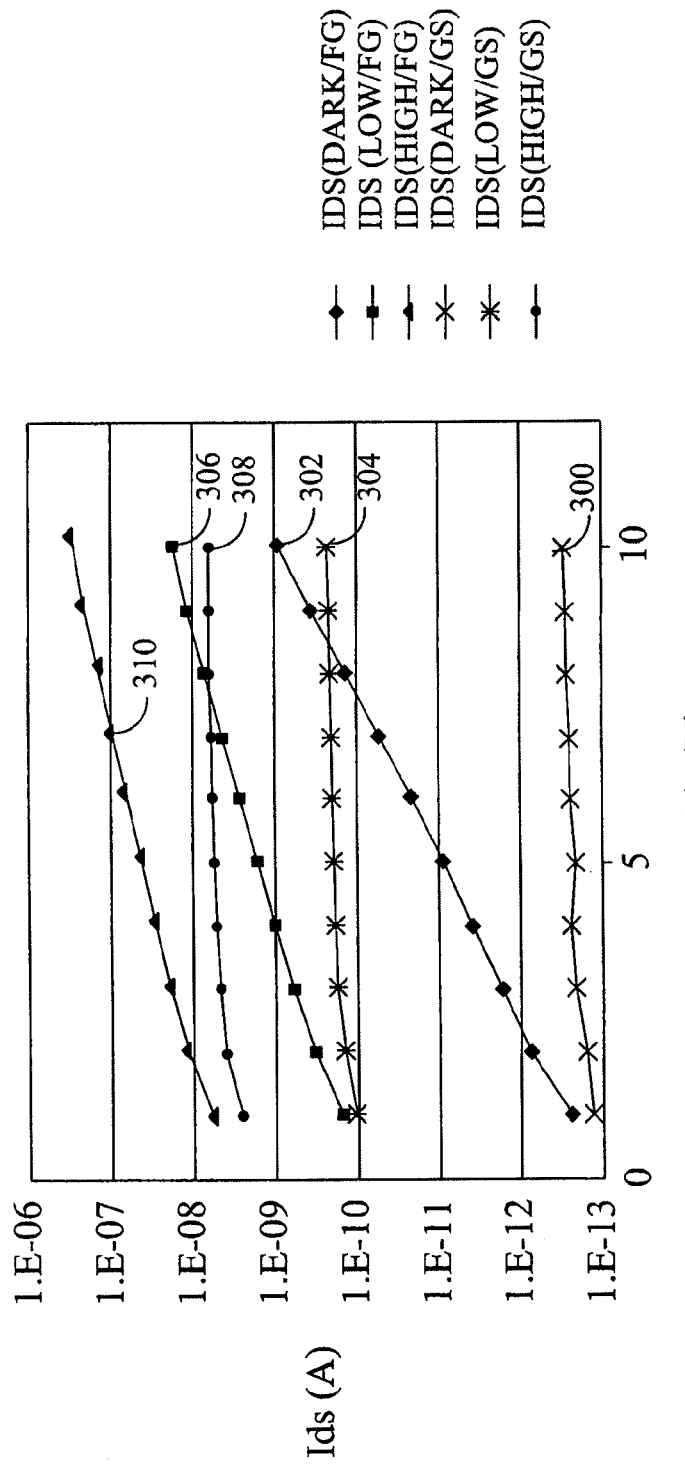
FIG. 11 is a graph of the photo-currents in an amorphous silicon TFT array.

Referring to FIG. 11, a graph of the photo-currents within amorphous silicon TFTs is illustrated. Line 300 illustrates a dark ambient environment with the gate connected to the source of the photo TFT. It will be noted that the leakage currents are low and relatively stable over a range of voltages. Line 302 illustrates a dark ambient environment with a floating gate of the photo TFT. It will be noted that the leakage currents are generally low and relatively unstable over a range of voltages (significant slope). Line 304 illustrates a low ambient environment with the gate connected to the source of the photo TFT. It will be noted that the leakage currents are three orders of magnitude higher than the corresponding dark ambient conditions and relatively stable over a range of voltages. Line 306 illustrates a low ambient environment with a floating gate of the photo TFT. It will be noted that the leakage currents are generally three orders of magnitude higher and relatively unstable over a range of voltages (significant slope). Line 308 illustrates a high ambient environment with the gate connected to the source of the photo TFT. It will be noted that the leakage currents are 4.5 orders of magnitude higher than the corresponding dark ambient conditions and relatively stable over a range of voltages. Line 310 illustrates a high ambient environment with a floating gate of the photo TFT. It will be noted that the leakage currents are generally 4.5 orders of magnitude higher and relatively unstable over a range of voltages (significant slope). With the significant difference between the dark state, the low ambient state, and the high ambient state, together with the substantially flat responses over a voltage range (source-drain voltage), the system may readily process the data in a confident manner, especially with the gate connected to the source. In general, the architecture preferably permits the leakage currents to be within one order of magnitude over the central 50%, more preferably over the central 75%, of the voltage range used for displaying images.

Figure 9:
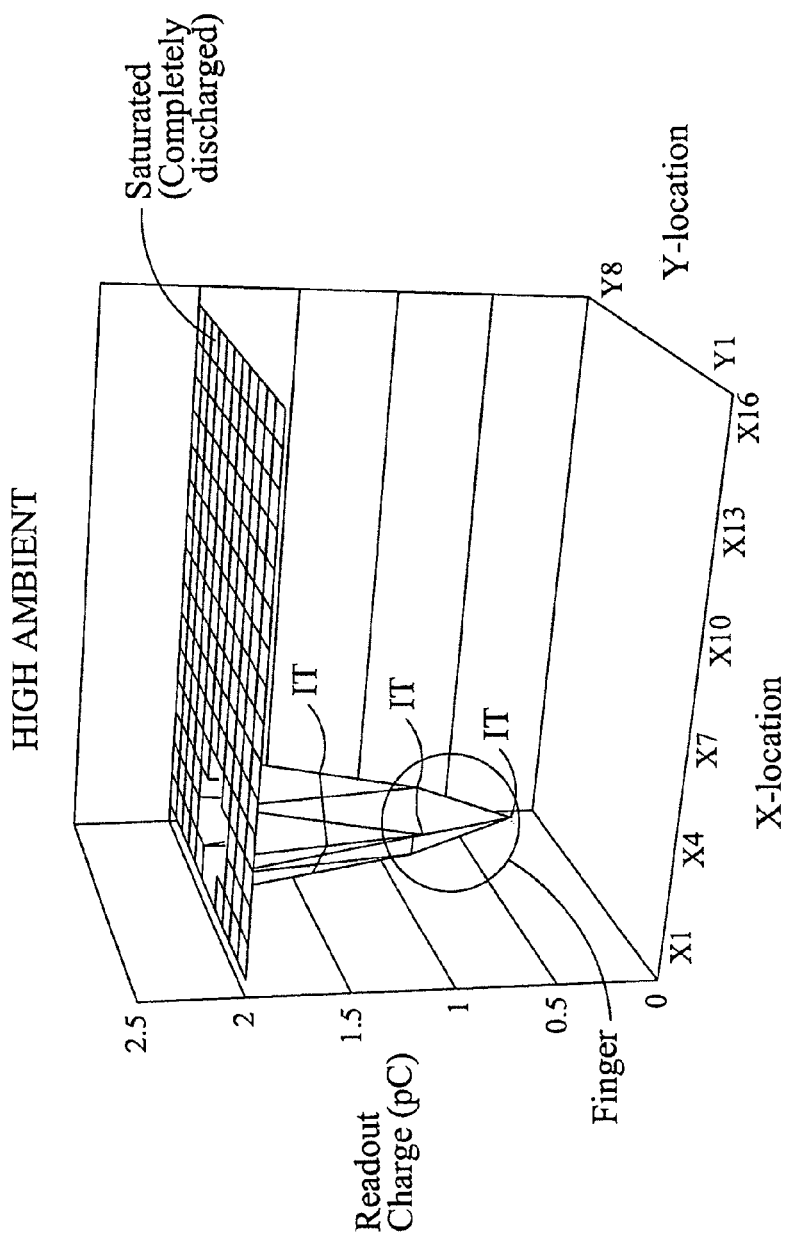
FIG. 9 is a graph of the capacitive charge on the light sensitive elements as a result of touching the display at high ambient lighting conditions.

Referring to FIG. 9, under high ambient lighting conditions the photo TFT will tend to completely discharge the Cst2 capacitor to the common voltage, perhaps with an offset voltage because of the photo TFT. In this manner, all of the photo TFTs across the display will tend to discharge to the same voltage level. Those regions with reduced ambient lighting conditions or otherwise where the user blocks ambient light from reaching the display, the Cst2 capacitor will not fully discharge, as illustrated by the downward spike in the graph. The downward spike in the graph provides location information related to the region of the display that has been touched.

Figure 10:
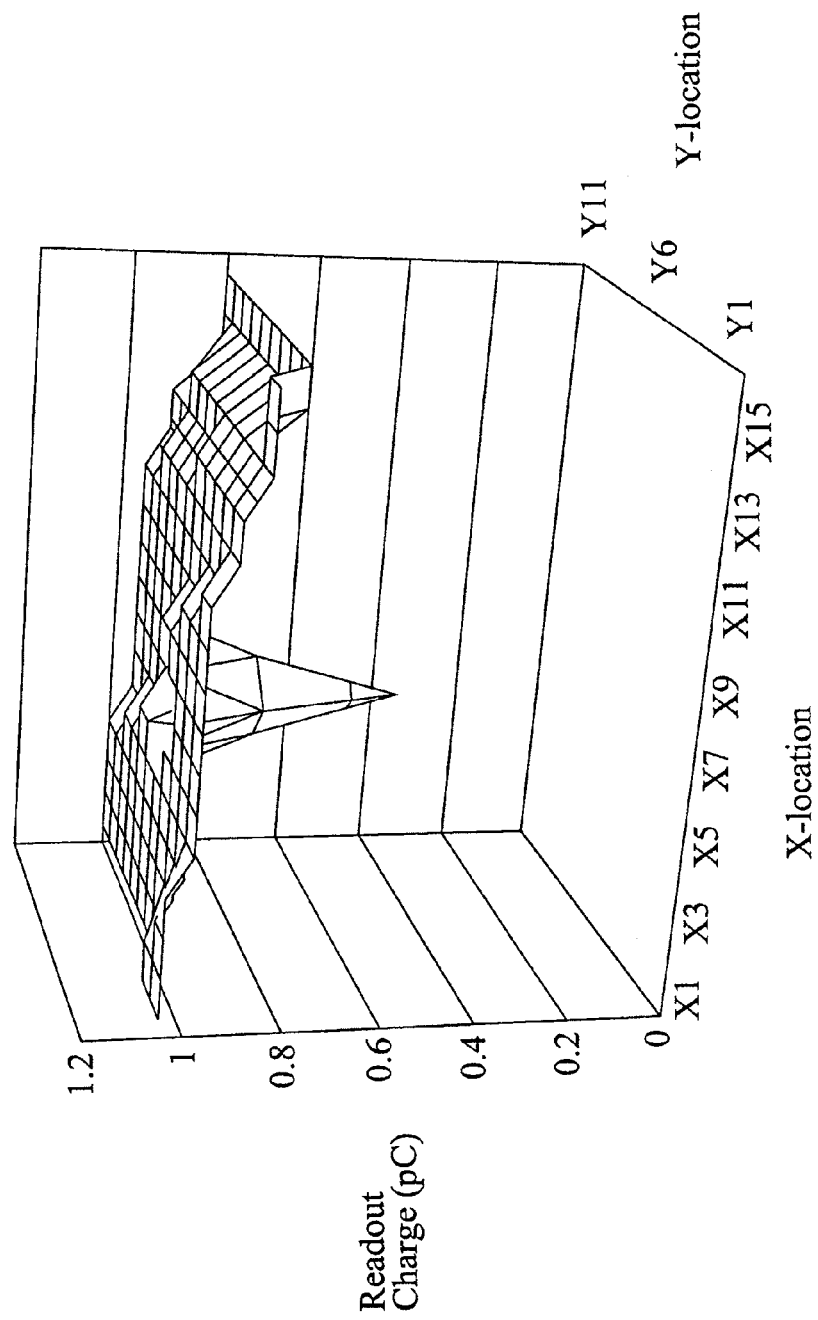
FIG. 10 is a graph of the capacitive charge on the light sensitive elements as a result of touching the display at low ambient lighting conditions.

Referring to FIG. 10, under lower ambient lighting conditions the photo TFT will tend to partially discharge the Cst2 capacitor to the common voltage. In this manner, all of the photo TFTs across the display will tend to discharge to some intermediate voltage levels. Those regions with further reduced ambient lighting conditions or otherwise where the user blocks ambient light from reaching the display, the Cst2 capacitor will discharge to a significantly less extent, as illustrated by the downward spike in the graph. The downward spike in the graph provides location information related to the region of the display that has been touched. As shown in FIGS. 9 and 10, the region or regions where the user inhibits light from reaching the display may be determined as localized minimums. In other embodiments, depending on the circuit topology, the location(s) where the user inhibits light from reaching the display may be determined as localized maximums or otherwise some measure from the additional components.

In the circuit topology illustrated, the value of the capacitor Cst2 may be selected such that it is suitable for high ambient lighting conditions or low ambient lighting conditions. For low ambient lighting conditions, a smaller capacitance may be selected so that the device is more sensitive to changes in light. For high ambient lighting conditions, a larger capacitance may be selected so that the device is less sensitive to changes in light. In addition, the dimensions of the phototransistor may be selected to change the photo-leakage current. Also, one set of light sensitive elements (e.g., the photo TFT and the capacitance) within the display may be optimized for low ambient lighting conditions while another set of light sensitive elements (e.g., the photo TFT and the capacitance) within the display may be optimized for high ambient lighting conditions. Typically, the data from light sensitive elements for low ambient conditions and the data from light sensitive elements for high ambient conditions are separately processed, and the suitable set of data is selected. In this manner, the same display device may be used for high and low ambient lighting conditions. In addition, multiple levels of sensitivity may be provided. It is to be understood that a single architecture may be provided with a wide range of sensitivity from low to high ambient lighting conditions. In addition, any suitable alternative architecture may be used for sensing the decrease and/or increase in ambient light.

Figure 12:
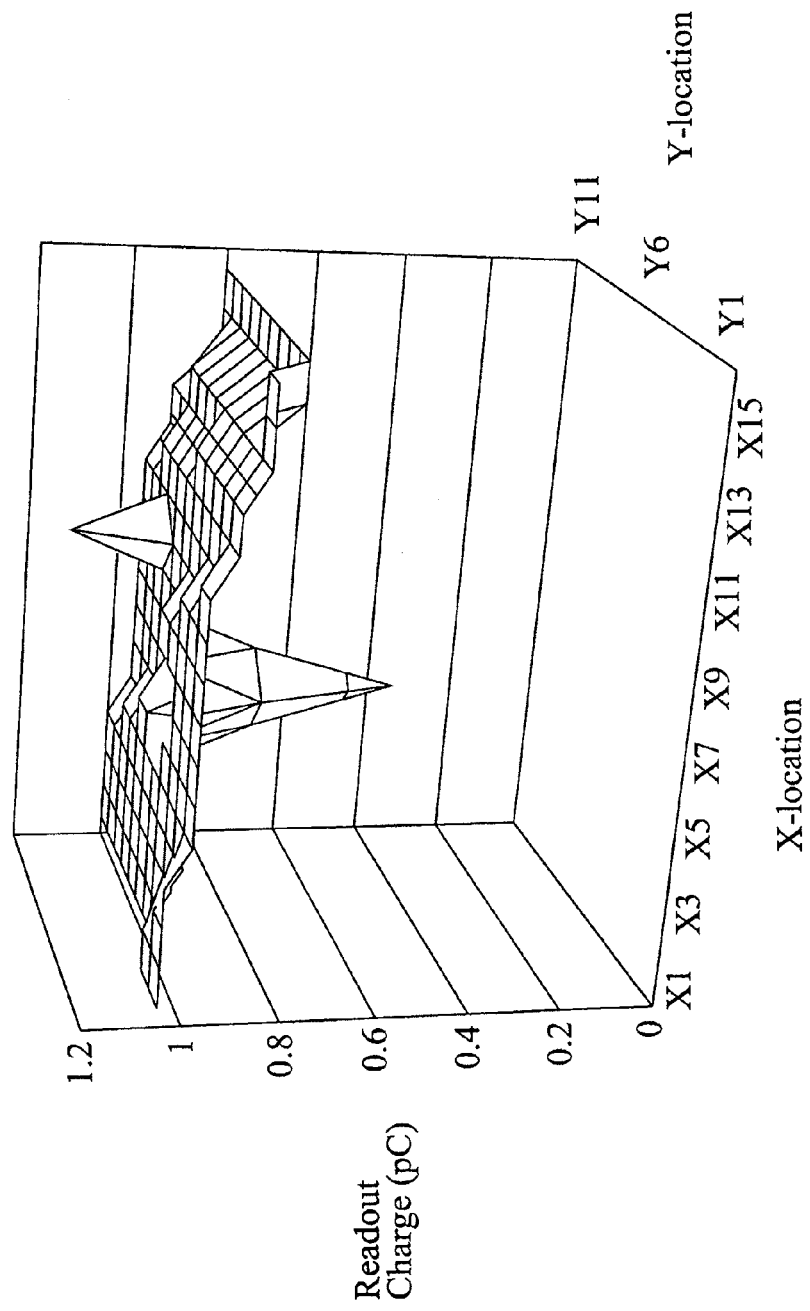
FIG. 12 is a graph of the capacitive charge on the light sensitive elements as a result of touching the display and providing light from a light pen.

Another structure that may be included is selecting the value of the capacitance so that under normal ambient lighting conditions the charge on the capacitor only partially discharges. With a structure where the capacitive charge only partially discharges, the present inventors determined that an optical pointing device, such as a light wand or laser pointer, might be used to point at the display to further discharge particular regions of the display. In this manner, the region of the display that the optical pointing device remains pointed at may be detected as local maximums (or otherwise). In addition, those regions of the display where light is inhibited will appear as local minimums (or otherwise). This provides the capability of detecting not only the absence of light (e.g., touching the panel) but likewise those regions of the display that have increased light incident thereon. Referring to FIG. 12, a graph illustrates local minimums (upward peaks) from added light and local maximums (downward peaks) from a lack of light. In addition, one set of light sensitive elements (e.g., the photo TFT and the capacitance) within the display may be optimized for ambient lighting conditions to detect the absence of light while another set of light sensitive elements (e.g., the photo TFT and the capacitance) within the display may be optimized for ambient lighting conditions to detect the additional light imposed thereon.

A switch associated with the display may be provided to select among a plurality of different sets of light sensitive elements. For example, one of the switches may select between low, medium, and high ambient lighting conditions. For example, another switch may select between a touch sensitive operation (absence of light) and an optical pointing device (addition of light). In addition, the optical pointing device may communicate to the display, such as through a wire or wireless connection, to automatically change to the optical sensing mode. A light sensor (external photo-sensor to the light sensitive elements in the active layer) and/or one or more of the light sensitive elements may be used to sense the ambient lighting conditions to select among different sets of light sensitive elements. Also the sensor and/or one or more light sensitive elements may be used to select, (1) to sense the absence of light, (2) select to sense the addition of light, and/or (3) adjust the sensing levels of the electronics.

In some embodiments the corresponding color filters for (e.g., above) some or all of the light sensitive elements may be omitted or replaced by a clear (or substantially clear) material. In this manner the light reaching some of the light sensitive elements will not be filtered by a color filter. This permits those light sensitive elements to sense a greater dynamic range or a different part of the dynamic range than those receiving filtered light.

It is noted that the teachings herein are likewise applicable to transmissive active matrix liquid crystal devices, reflective active matrix liquid crystal devices, transflective active matrix liquid crystal devices, etc. In addition, the light sensitive elements may likewise be provided within a passive liquid crystal display. The sensing devices may be, for example, photo resistors and photo diodes.

Alternatively, light sensitive elements may be provided between the rear polarizing element and the active matrix layer. In this arrangement, the light sensitive elements are preferably fabricated on the polarizer, or otherwise a film attached to the polarizer. In addition, the light sensitive elements may be provided on a thin glass plate between the polarizer and the liquid crystal material. In addition, the black matrix or otherwise light inhibiting material is preferably arranged so as to inhibit ambient light from striking the readout TFT while free from inhibiting light from striking the photo TFT. Moreover, preferably a light blocking material is provided between the photo TFT and/or the readout TFT and the backlight, such as gate metal, if provided, to inhibit the light from the backlight from reaching the photo TFT and/or the readout TFT.

Alternatively, light sensitive elements may be provided between the front polarizing element and the liquid crystal material. In this arrangement, the light sensitive elements are preferably fabricated on the polarizer, or otherwise a film attached to the polarizer. In addition, the light sensitive elements may be provided on a thin glass plate between the polarizer and the liquid crystal material. The light sensitive elements may likewise be fabricated within the front electrode layer by patterning the front electrode layer and including suitable fabrication techniques. In addition, a black matrix or otherwise light inhibiting material is preferably arranged so as to inhibit ambient light from striking the readout TFT while free from inhibiting light from striking the photo TFT. Moreover, preferably a light blocking material is provided between the photo TFT and/or the readout TFT and the backlight, if provided, to inhibit the light from the backlight from reaching the photo TFT and/or the readout TFT.

Alternatively, light sensitive elements may be provided between the front of the display and the rear of the display, normally fabricated on one of the layers therein or fabricated on a separate layer provided within the stack of layers within the display. In the case of a liquid crystal device with a backlight the light sensitive elements are preferably provided between the front of the display and the backlight material. The position of the light sensitive elements are preferably between (or at least partially) the pixel electrodes, when viewed from a plan view of the display. This may be particularly useful for reflective displays where the pixel electrodes are opaque. In addition for reflective displays, any reflective conductive electrodes should be arranged so that they do not significantly inhibit light from reaching the light sensitive elements. In this arrangement, the light sensitive elements are preferably fabricated on one or more of the layers, or otherwise a plate attached to one or more of the layers. In addition, a black matrix or otherwise light inhibiting material is preferably arranged so as to inhibit ambient light from striking the readout TFT while free from inhibiting light from striking the photo TFT. Moreover, preferably a light blocking material is provided between the photo TFT and/or the readout TFT and the backlight, if provided, to inhibit the light from the backlight from reaching the photo TFT and/or the readout TFT.

In many applications it is desirable to modify the intensity of the backlight for different lighting conditions. For example, in dark ambient lighting conditions it may be beneficial to have a dim backlight. In contrast, in bright ambient lighting conditions it may be beneficial to have a bright backlight. The integrated light sensitive elements within the display stack may be used as a measure of the ambient lighting conditions to control the intensity of the backlight without the need for an additional external photo-sensor. One light sensitive element may be used, or a plurality of light sensitive element may be used together with additional processing, such as averaging.

In one embodiment, the readout line may be included in a periodic manner within the display sufficient to generally identify the location of the "touch". For example the readout line may be periodically added at each $30^{th}$ column. Spacing the readout lines at a significant number of pixels apart results in a display that nearly maintains its previous brightness because most of the pixel electrodes have an unchanged size. However, after considerable testing it was determined that such periodic spacing results in a noticeable non-uniform gray scale because of differences in the size of the active region of the pixel electrodes. One potential resolution of the non-uniform gray scale is to modify the frame data in a manner consistent with the non-uniformity, such as increasing the gray level of the pixel electrodes with a reduced size or otherwise reducing the gray levels of the non-reduced size pixel electrodes, or a combination thereof. While a potential resolution, this requires additional data processing which increases the computational complexity of the system.

A more desirable resolution of the non-uniform gray scale is to modify the display to include a readout line at every third pixel, or otherwise in a manner consistent with the pixel electrode pattern of the display (red pixel, green pixel, blue pixel). Alternatively, a readout line is included at least every $12^{th}$ pixel (36 pixel electrodes of a red, blue, green arrangement), more preferably at least every $9^{th}$ pixel (27 pixel electrodes of a red, blue, green arrangement), even more preferably at least every $6^{th}$ pixel (18 pixel electrodes of a red, blue, green arrangement or 24 pixel electrodes of a red, blue, green arrangement), and most preferably at least every $3^{rd}$ pixel (3 pixel electrodes of a red, blue, green arrangement). The readout lines are preferably included for at least a pattern of four times the spacing between readout lines (e.g., $12^{th}$ pixel times 4 equals 48 pixels, $9^{th}$ pixel times 4 equals 36 pixels). More preferably the pattern of readout lines is included over a majority of the display. The resulting display may include more readout lines than are necessary to accurately determine the location of the "touch". To reduce the computational complexity of the display, a selection of the readout lines may be free from interconnection or otherwise not operationally interconnected with readout electronics. In addition, to further reduce the computational complexity of the display and to increase the size of the pixel electrodes, the readout lines not operationally interconnected with readout electronics may likewise be free from an associated light sensitive element. In other words, additional non-operational readout lines may be included within the display to provide a gray scale display with increased uniformity. In an alternative embodiment, one or more of the non-operational readout lines may be replaced with spaces. In this manner, the gray scale display may include increased uniformity, albeit with additional spaces within the pixel electrode matrix.

The present inventors considered the selection of potential pixel electrodes and came to the realization that the electrode corresponding to "blue" light does not contribute to the overall white transmission to the extent that the "green" or "red" electrodes. Accordingly, the system may be designed in such a manner that the light sensitive elements are associated with the "blue" electrodes to an extent greater than their association with the "green" or "red" electrodes. In this manner, the "blue" pixel electrodes may be decreased in size to accommodate the light sensitive elements while the white transmission remains substantially unchanged. Experiments have shown that reducing the size of the "blue" electrodes to approximately 85% of their original size, with the "green" and "red" electrodes remaining unchanged, results in a reduction in the white transmission by only about 3 percent.

While such an additional set of non-operational readout lines provides for increased uniform gray levels, the reduction of pixel apertures results in a reduction of brightness normally by at least 5 percent and possibly as much as 15 percent depending on the resolution and layout design rules employed. In addition, the manufacturing yield is decreased because the readout line has a tendency to short to its neighboring data line if the processing characteristics are not accurately controlled. For example, the data line and readout line may be approximately 6-10 microns apart along a majority of their length.

Figure 13:
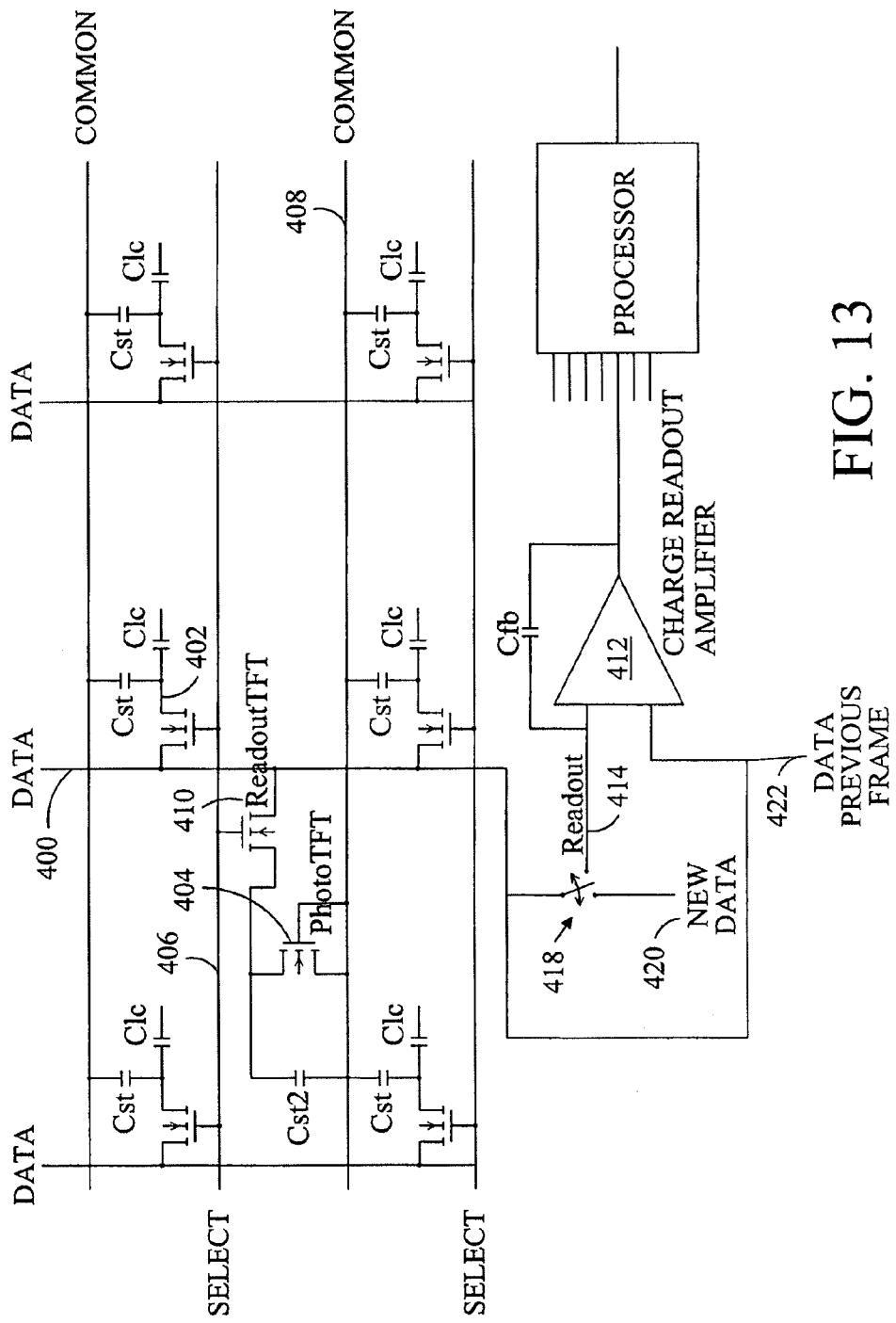
FIG. 13 is an alternative layout of the pixel electrodes.

Referring to FIG. 13, to increase the potential manufacturing yield and the brightness of the display, the present inventors came to the realization that the readout of the photo-sensitive circuit and the writing of data to the pixels may be combined on the same bus line, or otherwise a set of lines that are electrically interconnected to one another. To facilitate the use of the same bus line, a switch 418 may select between providing new data 420 to the selected pixels and reading data 414 from the selected pixels. With the switch 418 set to interconnect the new data 420 with the selected pixels, the data from a frame buffer or otherwise the video data stream may be provided to the pixels associated with one of the select lines. Multiple readout circuits may be used, or one or more multiplexed readout circuits may be used. For example, the new data 420 provided on data line 400 may be 4.5 volts which is latched to the pixel electrode 402 and the photo TFT 404 by imposing a suitable voltage on the select line 406. In this manner, the data voltage is latched to both the pixel electrode and a corresponding photo-sensitive circuit.

Figure 14:
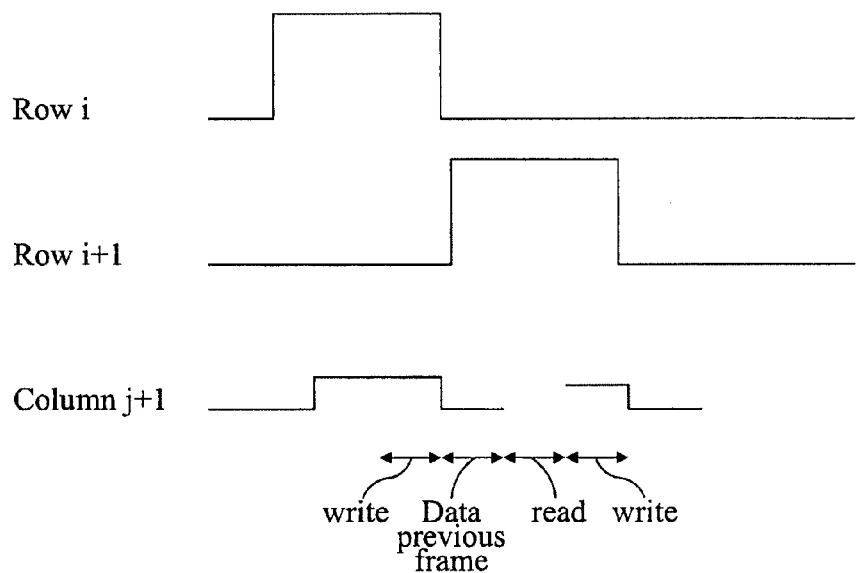
FIG. 14 illustrates a timing set for the layout of FIG. 13.

The display is illuminated in a traditional manner and the voltage imposed on the photo TFT 404 may be modified in accordance with the light incident on the photo-sensitive circuit, as previously described. In the topology illustrated, the photo TFT 404 is normally a N-type transistor which is reverse biased by setting the voltage on the common line 408 to a voltage lower than an anticipated voltage on the photo TFT 404, such as −10 or −15 volts. The data for the current frame may be stored in a frame buffer for later usage. Prior to writing the data for another frame, such as the next frame, the data (e.g., voltage) on the readout TFT 410 is read out. The switch 418 changes between the new data 420 to the readout line 414 interconnected to the charge readout amplifier 412. The select line 406 is again selected to couple the remaining voltage on the photo TFT 404 through the readout TFT 410 to the data line 400. The coupled voltage (or current) to the data line 400 is provided as an input to the charge readout amplifier 412 which is compared against the corresponding data from the previous frame 422, namely, the voltage originally imposed on the photo TFT 404. The difference between the readout line 414 and the data from the previous frame 422 provides an output to the amplifier 412. The output of the amplifier 412 is provided to the processor. The greater the drain of the photo TFT 404, normally as a result of sensing light, results in a greater output of the amplifier 412. Referring to FIG. 14, an exemplary timing for the writing and readout on the shared data line 400 is illustrated.

Figure 15:
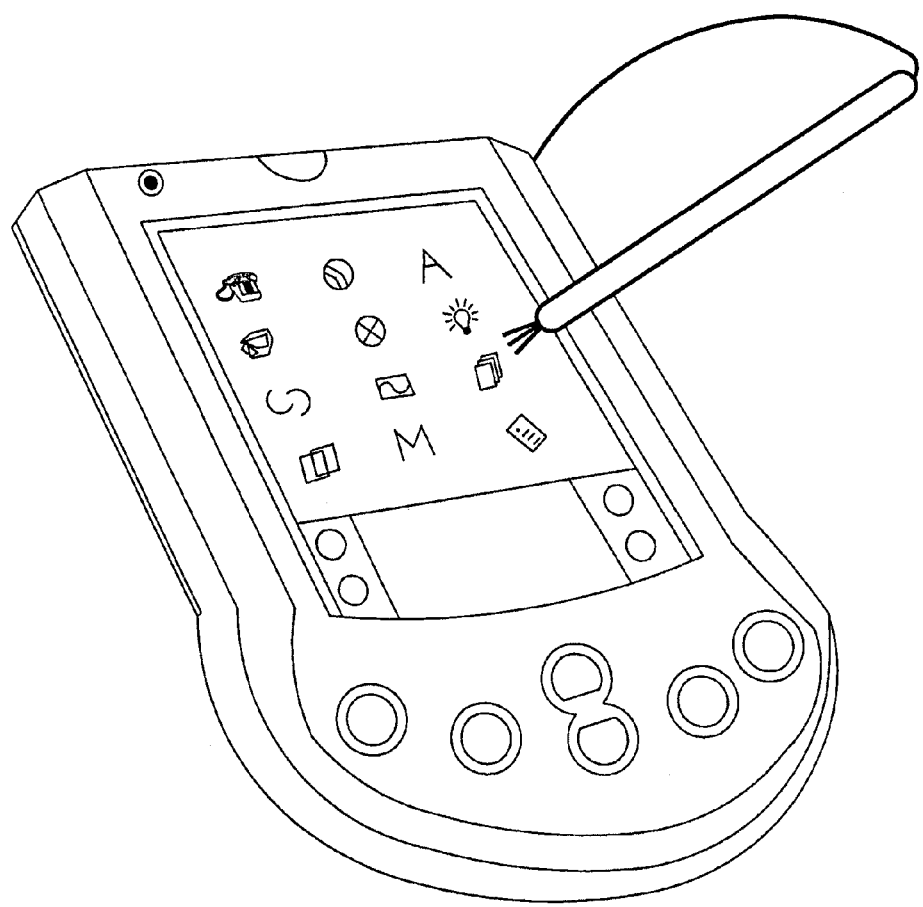
FIG. 15 illustrates a handheld device together with an optical wand.

At low ambient lighting conditions and at dark lighting conditions, the integrated optical touch panel is not expected to operate well to the touch of the finger because there will be an insufficient (or none) difference between the signals from the surrounding area and the touched area. To alleviate the inability to effectively sense at the low and dark ambient lighting conditions a light pen or laser pointer may be used (e.g., light source), as previously described. The light source may be operably interconnected to the display such as by a wire or wireless communication link. With the light source operably interconnected to the display the intensity of the light source may be controlled, at least in part, by feedback from the photo-sensitive elements or otherwise the display, as illustrated in FIG. 15. When the display determines that sufficient ambient light exists, such as ambient light exceeding a threshold value, the light source is turned "off". In this manner, touching the light source against the display results in the same effect as touching a finger against the display, namely, impeding ambient light from striking the display. When the display determines that insufficient ambient light exists, such as ambient light failing to exceed a threshold value, the light source is turned "on". In this manner, touching or otherwise directing the light from the light source against the display results in a localized increase in the received light relative to the ambient light level. This permits the display to be operated in dark ambient lighting conditions or by feedback from the display. In addition, the intensity of the light from the light source may be varied, such as step-wise, linearly, non-linearly, or continuously, depending upon the ambient lighting conditions. Alternatively, the light source may include its own ambient light detector so that feedback from the display is unnecessary and likewise communication between the light source and the display may be unnecessary.

Figure 16:
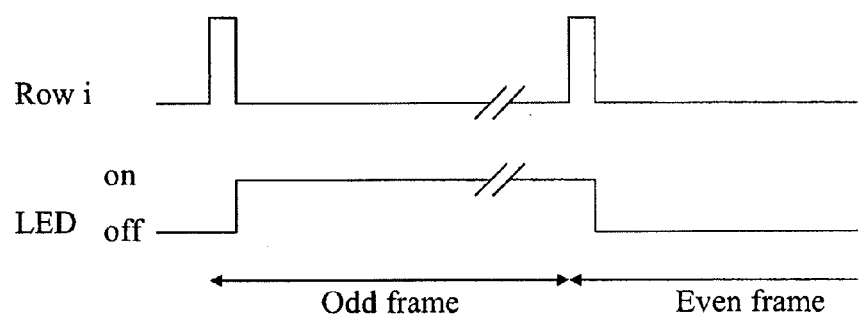
FIG. 16 illustrates even/odd frame addressing.

While using light from an external light source, while beneficial, it may still be difficult to accurately detect the location of the additional light because of background noise within the system and variable lighting conditions. The present inventors considered this situation and determined that by providing light during different frames, such as odd frames or even frames, or odd fields or even fields, or every third frame, or during selected frames, a more defined differential signal between the frames indicates the "touch" location. In essence, the light may be turned on and off in some manner, such as blinking at a rate synchronized with the display line scanning or frames. An exemplary timing for an odd/even frame arrangement is shown in FIG. 16. In addition, the illumination of some types of displays involves scanning the display in a row-by-row manner. In such a case, the differential signal may be improved by modifying the timing of the light pulses in accordance with the timing of the gate pulse (e.g., scanning) for the respective pixel electrodes. For example, in a top-down scanning display the light pulse should be earlier when the light source is directed toward the top of the display as opposed to the bottom of the display. The synchronization may be based upon feedback from the display, if desired.

In one embodiment, the light source may blink at a rate synchronized with the display line scanning. For example, the light source may use the same driver source as the image pixel electrodes. In another embodiment the use of sequential (or otherwise) frames may be subtracted from one another which results in significant difference between signal and ambient conditions. Preferably, the light sensitive elements have a dynamic range greater than 2 decades, and more preferably a dynamic range greater than 4 decades. If desired, the system may use two sequential fields of scanning (all lines) subtracted from the next two fields of scanning (all lines) so that all the lines of the display are used.

Another technique for effective operation of the display in dark or low level ambient conditions is using a pen or other device with a light reflecting surface that is proximate (touching or near touching) the display when interacting with the display. The light from the backlight transmitted through the panel is then reflected back into the photo-sensitive element and the readout signal will be greater at the touch location than the surrounding area.

Figure 17:
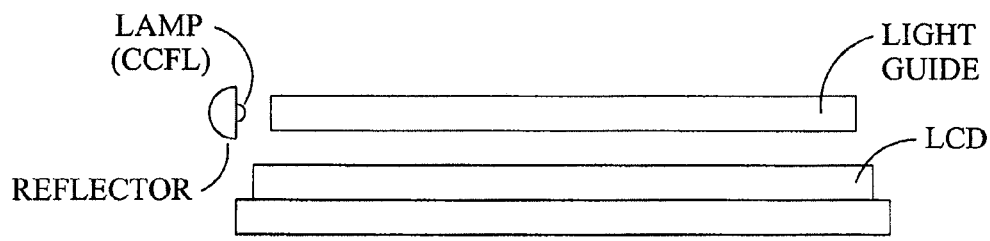
FIG. 17 illustrates a front illuminated display.
Figure 18:
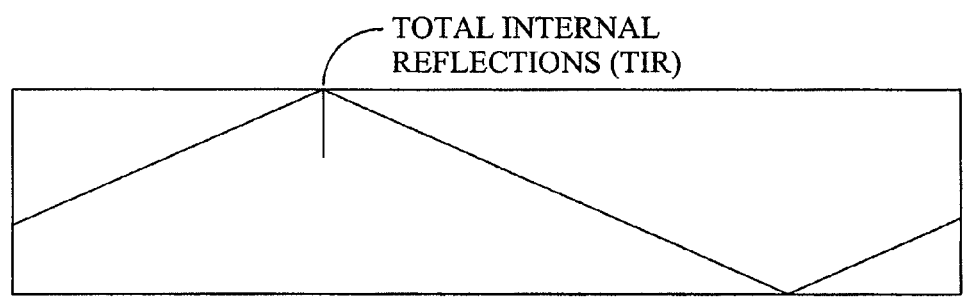
FIG. 18 illustrates total internal reflections.
Figure 19:
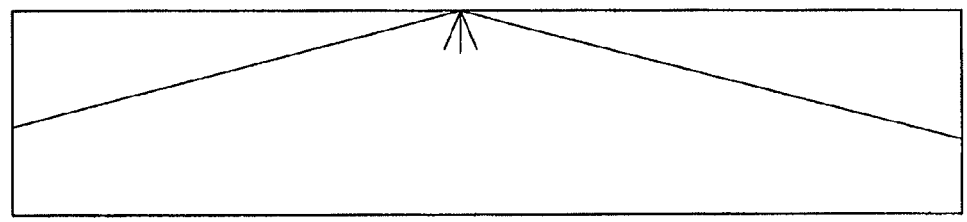
FIG. 19 illustrates a small amount of diffraction of the propagating light.

Referring to FIG. 17, another type of reflective liquid crystal display, typically used on handheld computing devices, involves incorporating a light guide in front of the liquid crystal material, which is normally a glass plate or clear plastic material. Normally, the light guide is constructed from an opaque material having an index of refraction between 1.4 and 1.6, more typically between 1.45 and 1.50, and sometimes of materials having an index of refraction of 1.46. The light guide may further include anti-glare and anti-reflection coatings. The light guide is frequently illuminated with a light source, frequently disposed to the side of the light guide. The light source may be any suitable device, such as for example, a cold cathode fluorescent lamp, an incandescent lamp, and a light emitting diode. To improve the light collection a reflector may be included behind the lamp to reflect light that is emitted away from the light guide, and to re-direct the light into the light guide. The light propagating within the light guide bounces between the two surfaces by total internal reflections. The total internal reflections will occur for angles that are above the critical angle, measured relative to the normal to the surfaces, as illustrated in FIG. 18. To a first order approximation, the critical angle β may be defined by Sin(β)=1/n where n is the index of refraction of the light guide. Since the surfaces of the light guide are not perfectly smooth there will be some dispersion of the light, which causes some illumination of the display, as shown in FIG. 19.

Figure 20:
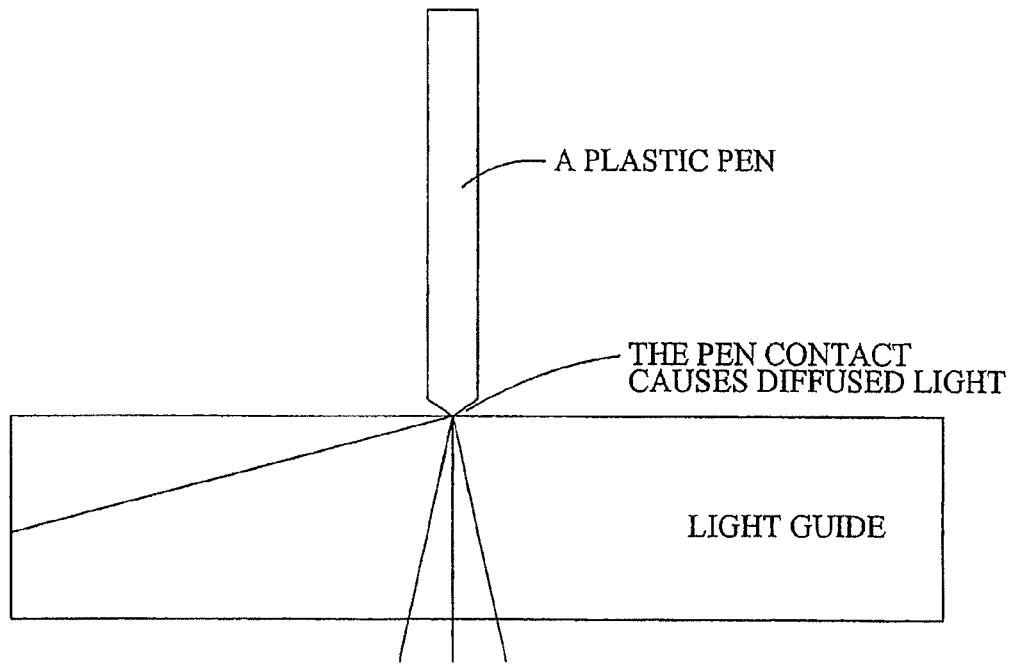
FIG. 20 illustrates significant diffraction as a result of a plastic pen.

The present inventors came to the realization that the critical angle and the disruption of the total internal reflections may be modified in such a manner as to provide a localized increase in the diffusion of light. Referring to FIG. 20, one suitable technique for the localized diffusion of light involves using a plastic pen to touch the front of the display. The internally reflected light coincident with the location that the pen touches the display will significantly diffuse and be directed toward the photo sensitive elements within the display. The plastic pen, or other object including the finger or the eraser of a pencil, preferably has an index of refraction within 0.5, more preferably within 0.25, of the index of refraction of the light guide. For example, the index of refraction of the light guide may be between 1.2 and 1.9, and more preferably between 1.4 and 1.6. With the two indexes of refraction sufficiently close to one another the disruption of the internal reflections, and hence amount of light directed toward the photo-sensitive elements, is increased. In addition, the plastic pen preferably has sufficient reflectivity of light as opposed to being non-reflective material, such as for example, black felt.

Figure 21:
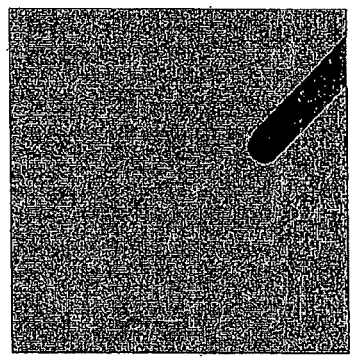
FIG. 21 illustrates a shadow of a pointing device and a shadow with illuminated region of a pointing device.
Figure 21:
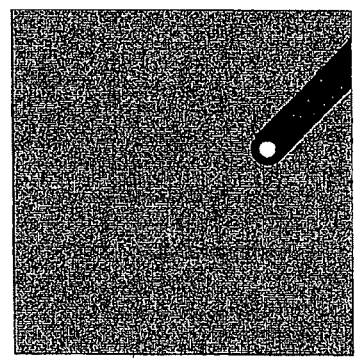

Referring to FIG. 21, after further consideration the present inventors were surprised to note that a white eraser a few millimeters away from the light guide results in a darkened region with generally consistent optical properties while a white eraser in contact with the light guide results in a darkened region with generally consistent optical properties together with a smaller illuminated region. In the preferred embodiment, the light sensitive elements are positioned toward the front of the display in relation to the liquid crystal material (or otherwise the light valve or electroluminescent material) so that a clearer image may be obtained. It is to be understood that any suitable pointing device may be used. The illuminated region has an illumination brighter in relation to the remainder of the darkened region. The illuminated region may be located by any suitable technique, such as for example, a center of gravity technique.

In some cases the display screen will have a relatively light colored region, such as white or tan, which is used as a virtual button for operating software. Within this light colored region is typically textual information in relatively dark letters. In liquid crystal display technology the light colored region is indicative of light passing through the liquid crystal material. Accordingly, if a pointing instrument includes a generally reflective material the light passing through the display may be reflected back through the display. The light reflected back through the display may be sensed by the light sensitive elements.

After further consideration of the illuminated region the present inventors came to the realization that when users use a "touch panel" display, there is a likelihood that the pointing device (or finger) may "hover" at a location above the display. Normally, during this hovering the user is not actually selecting any portion of the display, but rather still deciding where to select. In this manner, the illuminated region is beneficial because it provides a technique for the determination between when the user is simply "hovering" and the user has actually touched (e.g., "touching") the display.

Figure 22:
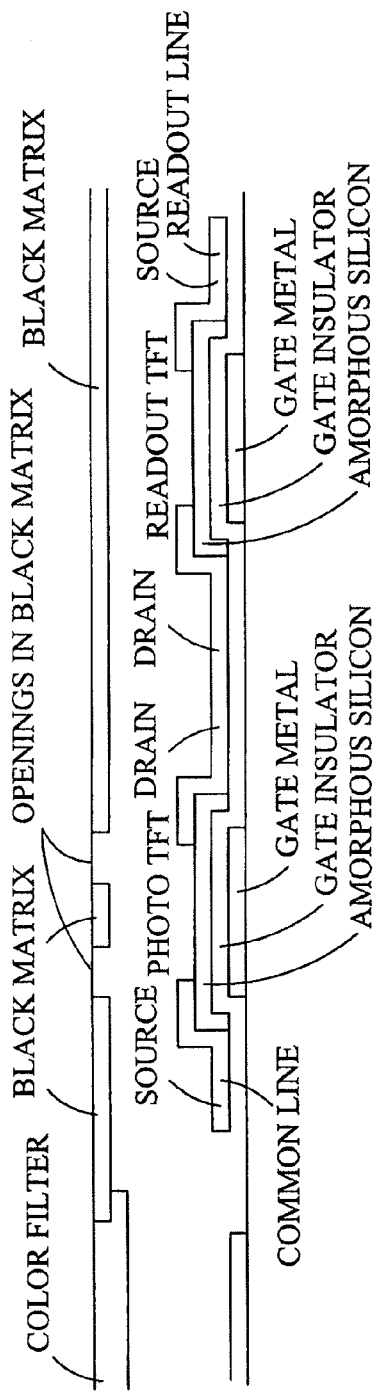
FIG. 22 illustrates a modified black matrix arrangement.

In part, the sensitivity to hovering may be related to the light sensitive elements being primarily sensitive to collimated light which is inhibited by the finger or other element in proximity to the device because of the alignment of the opening in the black matrix to the pixel electrodes. To reduce the dependency to collimated light the black matrix may include central material aligned with the respective pixel electrodes so that the light sensitive elements have an increased sensitivity to non-collimated light (or otherwise non-perpendicular or otherwise angled incident light), as illustrated in FIG. 22. In some embodiments, the openings may be considered a non-continuous opening or otherwise the spatial opening for a particular pixel is noncontinuous.

Another potential technique for the determination between "hovering" and "touching" is to temporally model the "shadow" region (e.g., light impeded region of the display). In one embodiment, when the user is typically touching the display then the end of the shadow will typically remain stationary for a period of time, which may be used as a basis, at least in part, of "touching". In another embodiment, the shadow will typically enlarge as the pointing device approaches the display and shrinks as the pointing device recedes from the display, where the general time between enlarging and receding may be used as a basis, at least in part, of "touching". In another embodiment, the shadow will typically enlarge as the pointing device approaches the display and maintain the same general size when the pointing device is touching the display, where the general time where the shadow maintains the same size may be used as a basis, at least in part, of "touching". In another embodiment, the shadow will typically darken as the pointing device approaches the display and maintain the same shade when the pointing device is touching the display, where the general time where the shadow maintains the same general shade may be used as a basis, at least in part, of "touching".

Figure 23:
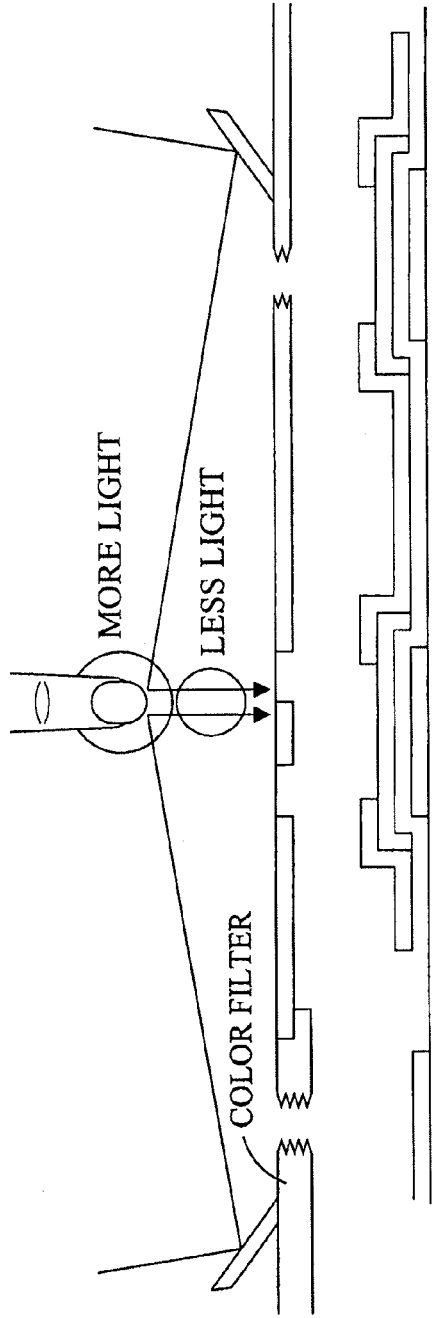
FIG. 23 illustrates a light reflecting structure.

To further distinguish between the finger or other devices being close to the display (or touching) or alternatively being spaced sufficiently apart from the display, a light directing structure may be used. One such light directing structure is shown in FIG. 23. The light directing structure is preferably included around a portion of the periphery of the display and may reflect ambient light across the frontal region of the display. The reflected light then reflects off the finger or other device thus increasing the light striking the light sensitive element when the finger or other device is spaced sufficiently apart from the display. The light reflecting off the finger or other device decreases when the finger or other device is near the display because of the angular reflections of light. The differences in the reflected light striking the display may be used, at least in part, to detect the touching of the display or otherwise inhibiting light to the display.

While attempting to consider implementation of such techniques on a handheld device it came to the inventor's surprise that the display portion of a handheld device has a refresh rate generally less than the refresh rate of the portion of the handwriting recognition portion of the display. The handheld portion of the display may use any recognition technique, such as Palm OS® based devices. The refresh rate of the display is typically generally 60 hertz while the refresh rate of the handwriting portion of the display is typically generally 100 hertz. Accordingly, the light-sensitive elements should be sampled at a sampling rate corresponding with the refresh rate of the respective portion of the display.

The technique described with respect to FIG. 20 operates reasonably well in dark ambient lighting conditions, low ambient lighting conditions, regular ambient lighting conditions, and high ambient lighting conditions. During regular and high ambient lighting conditions, the display is alleviated of a dependency on the ambient lighting conditions. In addition, with such lighting the illumination point is more pronounced and thus easier to extract. Unfortunately, during the daytime the ambient light may be sufficiently high causing the detection of the pointing device to be difficult. In addition, shades of the ambient light may also interfere with the detection techniques.

The present inventors considered improving the robustness of the detection techniques but came to the realization that with sufficient "noise" in the system the creation of such sufficiently robust techniques would be difficult. As opposed to the traditional approach of improving the detection techniques, the present inventors came to the realization that by providing light to the light guide of a limited selection of wavelengths and selectively filtering the wavelengths of light within the display the difference between touched and untouched may be increased. As an initial matter the light from the light source provided to the light guide is modified, or otherwise filtered, to provide a single color. Alternatively, the light source may provide light of a range of wavelengths, such as 600-700 nm, or 400-500 and 530-580, or 630. Typically, the light provided to the light guide has a range of wavelengths (in any significant amount) less than white light or otherwise the range of wavelengths of ambient light. Accordingly, with the light provided to the light guide having a limited color gamut (or reduced color spectrum) the touching of the pointing device on the display results in the limited color gamut light being locally directed toward the light-sensitive elements. With a limited color gamut light being directed toward the display as a result of touching the light guide (or otherwise touching the front of the display), a color filter may be included between the light guide and the light-sensitive elements to filter out at least a portion of the light not included within the limited color gamut. In other words, the color filter reduces the transmission of ambient light to an extent greater than the transmission of light from the light source or otherwise within the light guide. For example, the ambient light may be considered as "white" light while the light guide has primarily "red" light therein. A typical transmission of a red color filter for ambient white light may be around 20%, while the same color filter will transmit about 85% of the red light. Preferably the transmission of ambient light through the color filter is less than 75% (greater than 25% attenuation) (or 60%, 50%, 40%, 30%) while the transmission of the respective light within the light guide is greater than 25% (less than 25% attenuation) (or 40%, 50%, 60%, 70%), so that in this manner there is sufficient attenuation of selected wavelengths of the ambient light with respect to the wavelengths of light within the light guide to increase the ability to accurately detect the touching.

In another embodiment, the light source to the light guide may include a switch or otherwise automatic modification to "white" light when operated in low ambient lighting conditions. In this manner, the display may be more effectively viewed at low ambient lighting conditions.

In another embodiment, the present inventors determined that if the light source providing light to the display was modulated in some fashion an improvement in signal detection may be achieved. For example, a pointing device with a light source associated therewith may modulate the light source in accordance with the frame rate of the display. With a frame rate of 60 hertz the pointing device may for example modulate the light source at a rate of 30 hertz, 20 hertz, 10 hertz, etc. which results in additional light periodically being sensed by the light sensitive elements. Preferably, the light source is modulated ("blinked") at a rate synchronized with the display line scanning, and uses the same raw drivers as the image thin-film transistors. The resulting data may be processed in a variety of different ways.

In one embodiment, the signals from the light sensitive elements are used, as captured. The resulting improvement in signal to background ratio is related to the pulse length of the light relative to the frame time. This provides some additional improvement in signal detection between the light generated by the pointing device relative to the ambient light (which is constant in time).

In another embodiment, multiple frames are compared against one another to detect the presence and absence of the additional light resulting from the modulation. In the case of subsequent frames (sequential or non-sequential), one without additional light and one with additional light, the data from the light sensitive elements may be subtracted from one another. The improvement in signal to background ratio is related to the periodic absence of the additional light. In addition, this processing technique is especially suitable for low ambient lighting and high ambient lighting conditions. Preferably the dynamic range of the sensors is at least 4 decades, and two sequential frames with additional light and two sequential frames without additional light are used so that all of the scanning lines are encompassed. When the system charges a sensor it takes a whole frame for it to discharge by the light. Since the first line will start at time zero and take a frame time, the last line will be charged after almost a frame and will take another frame time to discharge. Therefore, the system should preferably use two frames with additional illumination and then two frames without additional illumination.

While the light sensitive elements may be used to determine "touch" and the location of the "touch", it is sometimes problematic to distinguish between "hovering" and "touch". To assist in the determination of actual touching of the display a pressure based mechanism may be used. One pressure based mechanism may include pressure sensitive tape between a pair of layers of the display or between the display and a support for the display. Another pressure based mechanism may include an electrical or magnetic sensor operably connected to the display. In either case, the pressure based mechanism provides a signal to the display electronics indicating the sensing of pressure (e.g., touch) or alternatively the absence of pressure (e.g., non-touch).

Figure 24:
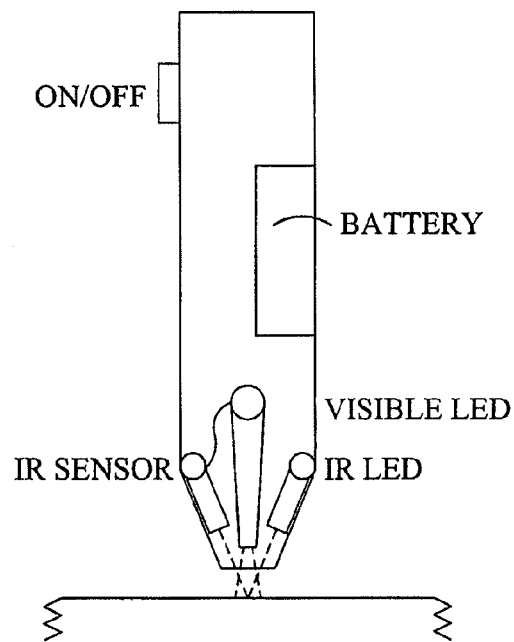
FIG. 24 illustrates a pen.

Referring to FIG. 24, one configuration of an elongate light emitting device includes an infra-red light emitting diode that periodically or continuously emits an infra-red beam. The infra-red beam is transmitted from the light emitting device and reflects off the display. When the light pen is spaced sufficiently far from the display the reflected infra-red beam will not strike the light pen. When the light pen is spaced sufficiently close to the display the reflected infra-red beam will strike the light pen and is sensed by an infra-red sensor within the light pen. Infra-red light is preferred, while any suitable wavelength may be used that the light sensitive elements of the display are generally insensitive to. When the infra-red sensor senses the reflected infra-red light the visible light emitting diode is turned on to illuminate the pixel. The visible light emitting diode preferably provides a wavelength that the light sensitive elements of the display are sensitive to. After a predetermined duration or otherwise while the infra-red light is not being sensed by the infra-red sensor the visible light emitting diode is turned off. In this manner, battery power within the light pen is conserved. In addition, the edge or shape of the visible light from the visible light emitting diode may be used to determine the spacing between the light pen and the display. Also, the beam from the visible light emitting diode may be varied based upon the signal sensed by the infra-red sensor.

Figure 25:
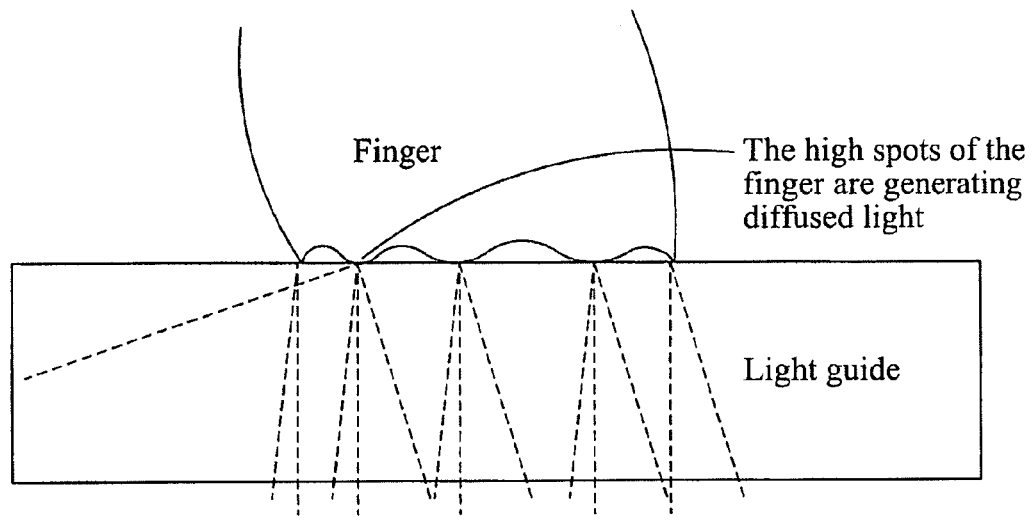
FIG. 25 illustrates a light guide and finger.

Upon reconsidering the display with a light guide, as illustrated in FIG. 17, the present inventors realized that those portions of the light guide that are in contact with the high portion of the user's fingerprints will tend to diffuse and scatter light toward the light sensitive elements, as illustrated in FIG. 25. Those portions of the light guide that are not in contact with the high portion of the user's fingerprints (i.e., valleys) will not tend to diffuse and scatter light toward the light sensitive elements. Depending on the thickness of the light guide and liquid crystal material together with the density of the light sensitive elements, the details observable in the fingerprint will vary. To increase the ability to detect the fingerprint, the display may be designed with multiple densities of light sensitive elements. For example, in the region where the fingerprint is normally located the density of the light sensitive elements may be increased such as including a light sensitive element at every sub-pixel. In this manner, the display includes multiple densities of light sensitive elements. Moreover, the display may likewise be used for sensing other items, such as for example, bar codes.

Figure 26:
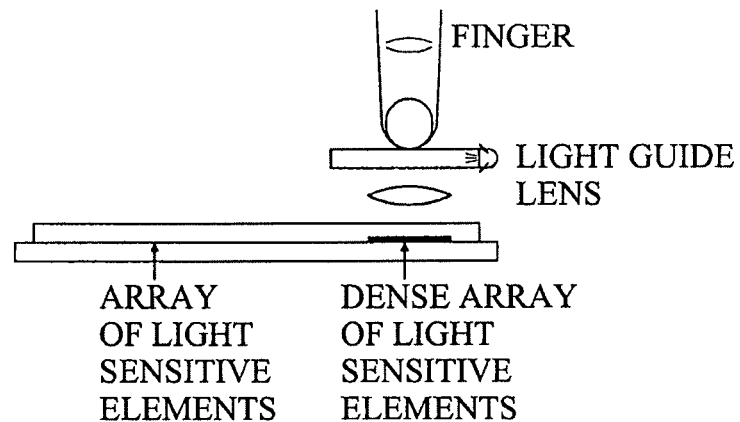
FIG. 26 illustrates a display with multiple sensor densities and optical elements.

In some cases there may be excessive parallax which causes a smeared image to be detected. In addition, oil and sweat on the fingers may tend to reduce the contrast between the high and low point of the user's fingerprint. Referring to FIG. 26, a separate sensor structure may be included within the display. The sensor structure may include a lens between the light guide and the light sensitive elements. The lens may be any suitable lens structure, such as for example, a small focus lens or a SELFOC lens (variable index of refraction fiber optics). The color filters in the fingerprint sensing region may be omitted, if desired.

To increase the ability of the light sensitive elements to detect the details that may be present within a fingerprint it is desirable to have a greater density of light sensitive elements in the region where the fingerprint is to be sensed. In this manner the display may include two (or more) different densities of light sensitive elements across the display. Alternatively, the light guide and lens may be omitted and a high density of light sensitive elements included for fingerprint sensing. It is to be understood that other items may likewise be sensed with the high density light sensitive elements.

The light sensitive elements will tend to observe very high ambient lighting conditions when the finger is not present rendering their ability to detect high contrast images difficult. To increase the effective sensitivity of the light sensitive elements a color filter may be provided in an overlying relationship to the light sensitive elements. In addition, the light source may be selected in relation to the color filter. For example, a blue filter may be used together with a blue light source. In addition, the illumination may be modulated and synchronized with the sensors. In this case, the light source may be illuminated with relatively short pulses together with the triggering of the sensing by the light sensitive elements. In the case where the light is pulsed in relation to the frame rate it is preferably pulsed at half the frame rate. In this manner the light pulses will be ensured to be sensed during different frames. Also, a light inhibiting material may closely surround the region where the finger is located to reduce stray ambient light, thus increasing contrast.

For the detection of fingerprints, sweat and oil from the fingers may impact the ability to accurately sense the fingerprint. Sweat is primarily water with an index of refraction of approximately 1.3. Typical glass has an index of refraction of approximately 1.5 which is sufficiently different than 1.3, and accordingly sweat will not significantly negatively impact image sensing. However, oils have an index of refraction of approximately 1.44 to 1.47 which is considerably closer to 1.5, and accordingly oil will tend to significantly impact image sensing. In order to improve the contrast, hence image sensing, the glass may be replaced with glass having a higher index of refraction or glass coated with a material having a higher index of refraction, such as for example, 1.55 or more.

Figure 27:
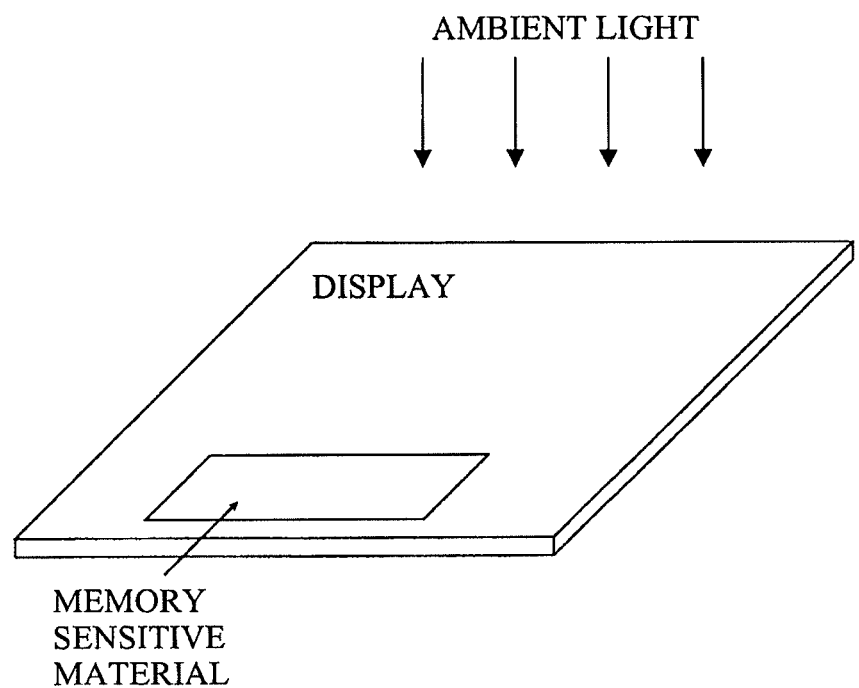
FIG. 27 illustrates a display with memory maintaining material.

Attempting to record signatures may be problematic with many touch sensitive displays because the response time of the recording system is inadequate or otherwise the software has a slow sampling rate. However, the user normally prefers immediate feedback. Referring to FIG. 27 the display may include a signature portion that includes a memory maintaining material. The memory maintaining material may sense the writing of the signature, such as by pressure exerted thereon or light sensitive material. For example, the memory material may be a pair of flexible layers with fluid there between that is displaced while writing the signature. After writing the name the user may press a button or otherwise touch another portion of the display indicating that the signature is completed. Alternatively, the display may sense the signature by a sufficient change in the optical properties of the memory maintaining material. The display may then capture an image of the signature. For example, the image of the signature may come from ambient light passing through the memory maintaining material or otherwise from light reflected off the memory maintaining material, especially when the display is in transmissive ("white") mode. The signature may be cleared in any manner, such as electrical erasure or physical erasure by any suitable mechanism. In this manner, the temporal limitations of writing a signature are reduced.

Alternatively the display may include a signature mode that captures the user's signature over several frames. The signature may be captured on a predetermined region of the display or otherwise any portion of the display. The system detects the decrease in ambient light over a series of frames as the signature is written. In this manner the "path" of the signature may be determined and thereafter used in any suitable manner.

Figure 28:
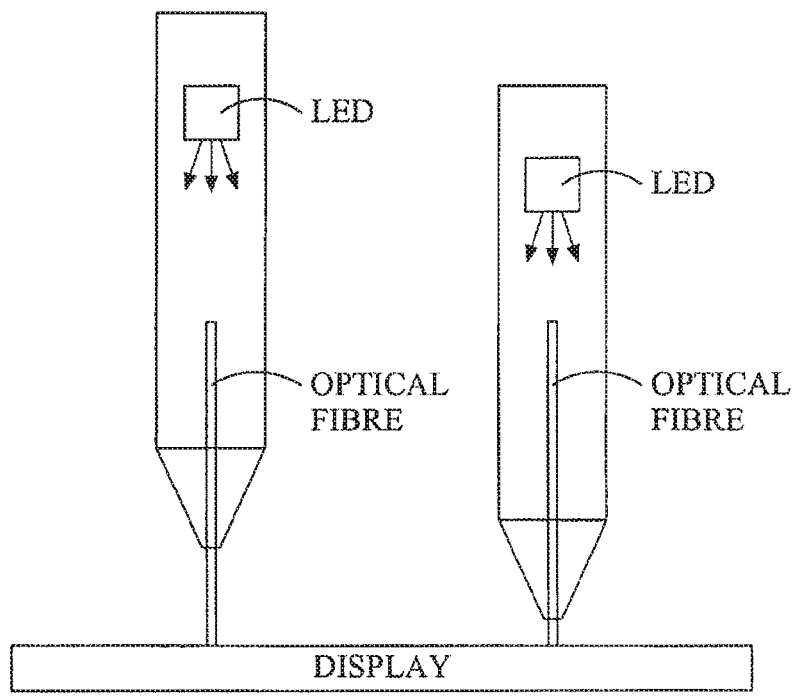
FIG. 28 illustrates another pen.

In many cases the user desires the tactile response of pen pressure against the display. In this manner, the user has greater comfort with the pen and display for writing, drawing, or otherwise indicating a response. Referring to FIG. 28, the pen may include a movable optical path (e.g., a fiber optic bundle) with respect to the pen that extends and retracts based upon pressure exerted on the display. A light emitting diode provides a beam of light that is channeled through the optical path. As it may be observed, when the optical path is in a retracted state that more light passes through the optical path than when the optical path is in an extended state. In this manner, the light sensitive elements may detect the intensity of the transmitted light and determine the pressure that is being exerted against the display by the user. This capability is particularly useful for pressure sensitive applications, such as Photoshop by Adobe.

Figure 29:
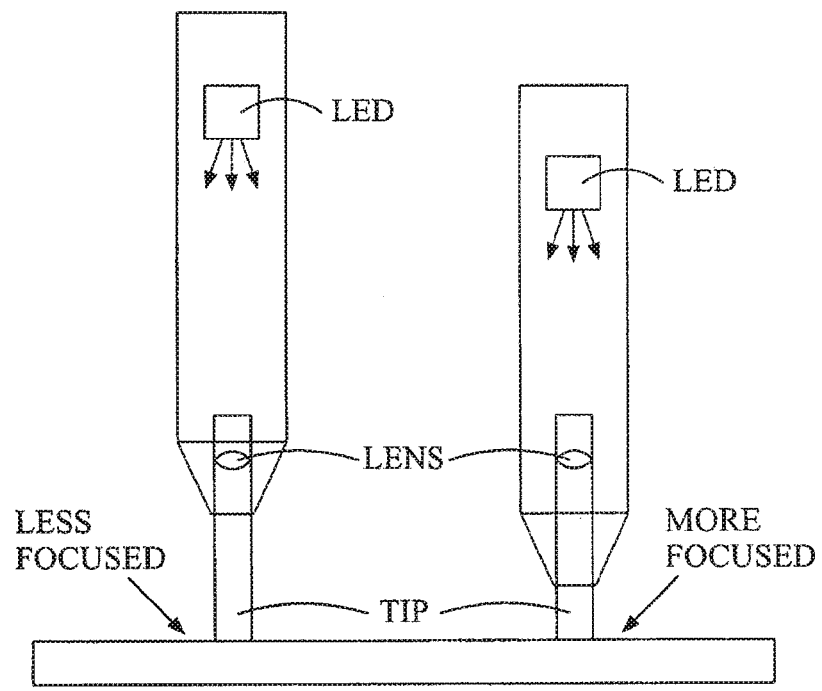
FIG. 29 illustrates another pen.

Referring to FIG. 29 another pen pressure embodiment is illustrated. A cylindrical tubular tip portion is movable with respect to the pen that extends and retracts based upon pressure exerted on the display. Within the cylindrical tubular tip portion is a lens. The lens focuses the light emitted from a light emitting diode, which preferably is maintained stationary with respect to the pen and/or moves with respect to the cylindrical tubular tip portion. Alternatively, the light emitting diode may be connected to the tip portion of the pen. As it may be observed, when the cylindrical tubular tip portion is in a retracted state light may be more focused on the display (light sensitive elements) than when the cylindrical tubular tip portion is in an extended state. The lens may be modified so that it operates in a reversed manner. The focus of the beam may be detected in any suitable manner by the light sensitive elements (e.g., size and/or intensity) to determine the pressure that is being exerted against the display by the user.

Figure 30:
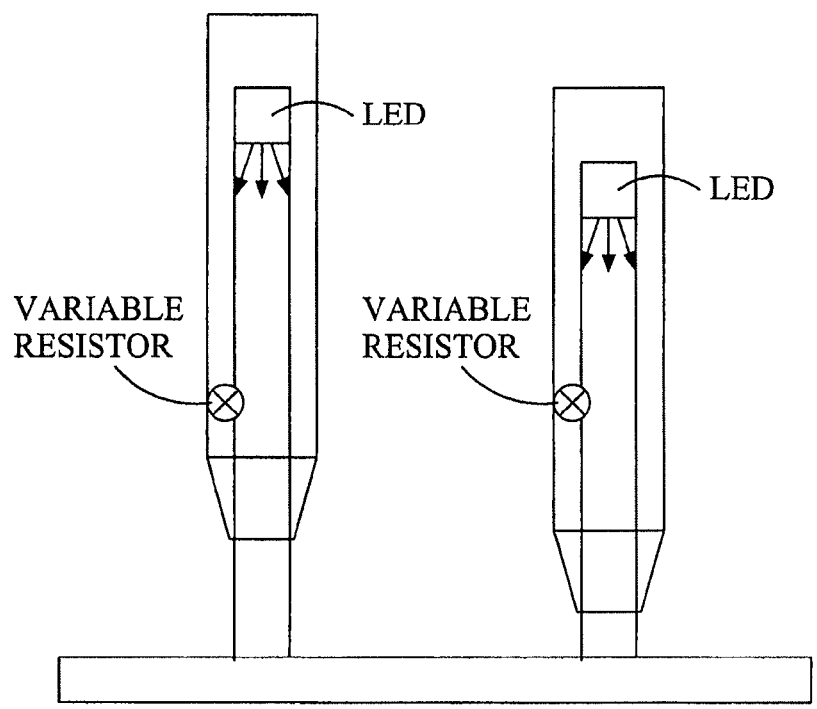
FIG. 30 illustrates another pen.

Referring to FIG. 30 another pen pressure embodiment is illustrated. A cylindrical tubular tip portion or optical light guide is movable with respect to the pen that extends and retracts based upon pressure exerted on the display. As the cylindrical tubular tip portion moves with respect to the pen the resistance of a variable resistive element changes. The variable resistive element is interconnected to a light emitting diode which changes intensity based upon the change in the variable resistance. The intensity of light sensed by the light sensitive elements, or otherwise the change in intensity sensed by the light sensitive elements, may be used to determine the pressure that is being exerted against the display by the user.

Figure 31:
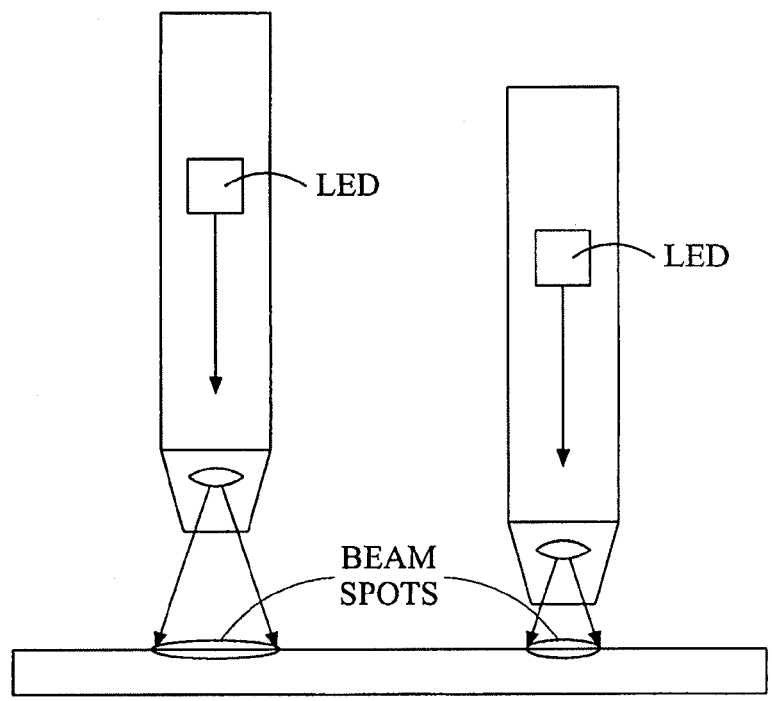
FIG. 31 illustrates another pen.

Referring to FIG. 31 another pen pressure embodiment is illustrated. An optional lens focuses a beam from a light emitting diode. When the pen is farther from the display a larger spot size and/or intensity is sensed by the light sensitive elements with respect to when the pen is closer to the display. The intensity of the light and/or the size of the spot sensed by the light sensitive elements or otherwise the change in intensity and/or size may be used to determine the pressure that is being exerted against the display by the user.

Figure 32:
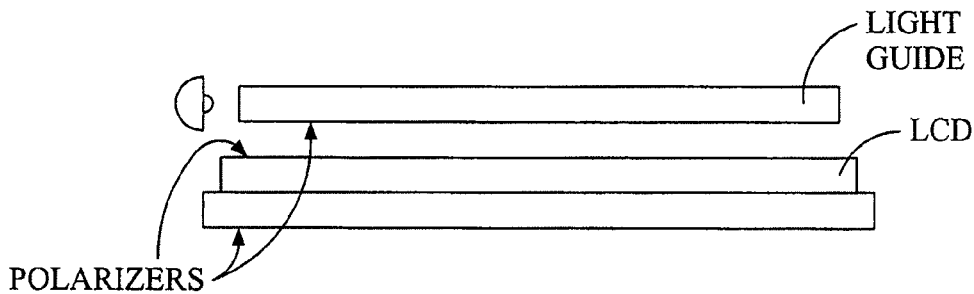
FIG. 32 illustrates another light guide.

Referring to FIG. 32, a modified light guide type structure is shown. A polarizer may be included on the lower surface of the light guide. In addition, other polarizers may be included on the front and rear surfaces of the liquid crystal display. The polarizer on the lower surface of the light guide preferably matches (±5 degrees, ±2 degrees) the orientation of the polarizer on the front surface of the liquid crystal display. The polarizers may include anti-reflection coatings if desired. With the top two polarizers being included together with proper alignment between them more of the light from the pen will tend to pass through to the liquid crystal display.

Figure 33:
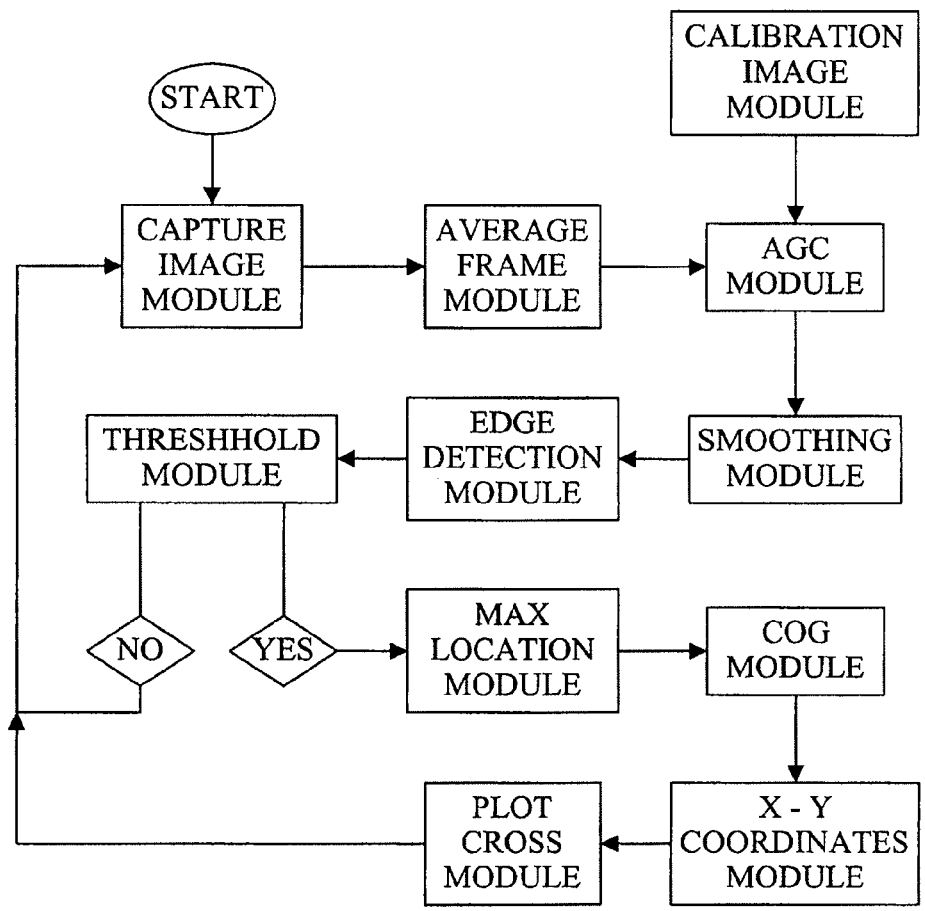
FIG. 33 illustrates an image acquisition and processing technique.

Referring to FIG. 33 an exemplary image processing technique is illustrated for processing the data from the display to determine the location of the touch. The display is initially calibrated by a calibration image module. For calibration, an image is obtained with the display covered by a black cloth or otherwise blocked from receiving ambient light. The black reference image may be referred to as I0. Then an image may be obtained under normal uniform (e.g., without significant shadows or light spots) ambient lighting conditions and referred to as I1. A comparison between I0 and I1 may be performed to calibrate the display.

During operation, the image is initially captured by a capture image module. For example, a 60×60 sensor matrix may be captured. Optionally a set of consecutive frames may then be averaged by an average frame module in order to reduce the noise in the signal, such as for example four frames.

An AGC module may perform an automatic gain control function in order to adjust for an offset in the value. One particular implementation may be described by the following equation: $Ie=\{(Is-I0)/(I1-I0)\}$. Ie is the signal after equalization. "Is" is the sensor signal as captured or after averaging. I0 is the stored sensor reading for the black reference image. I1 is the stored sensor reading for the bright (e.g., ambient lighting conditions) reference image. The equalization module uses I0 to adjust for the potential non-zero value at dark conditions. In particular, this adjustment is made by the calculation of Is−I0. The resulting comparison (e.g., division) of the captured signal versus the stored bright reference signals adjusts the level of the signal. Moreover, the output of the equalization is a normalized signal with a range from 0 to 1 in the case that Is<I1. Ie may then be used to adjust the gain of the output of the average frame module or captured image value. The AGC module thus effectively corrects for dark level non-uniformity and for sensor gain non-uniformity.

A smoothing module may be used to average proximate values together to compensate for non-uniformity in the characteristics of the display. A suitable filter is an averaging of the 8 adjacent pixels to a central pixel. Inherently the system provides relatively sharp edges from the signals which may be used directly. However, with the capability in some embodiments of detecting positive and negative outputs it was determined that using an edge detection module is beneficial. A preferred edge detection technique uses a 3×3 matrix, such as for example: $\{(-1-1-1)\ (-1-8-1)\ (-1-1-1)\}$. The effect of the edge detection module is to enhance or otherwise determine those regions of the image that indicate an edge. Other edge detection techniques may likewise be used, such as for example, a Sobel edge detection technique, a $1^{st}$ derivative technique, and a Robert's cross technique.

A threshold module may be used to set all values below a predetermined threshold value to zero, or otherwise indicate that they are not edges or regions being touched. In the case that the system provides negative values the predetermined threshold value may be less than an absolute value. The use of threshold values assists in the discrimination between the end of the finger touching the display and the shade from the hand itself. If there are an insufficient number of pixels as a result of the threshold module that are non-thresholded then the system returns to the start.

If there are a sufficient number of pixels as a result of the threshold module that are non-thresholded then the system determines the largest region of non-thresholded values using a max location module. In this manner, smaller regions of a few values may be removed so that the predominant region of non-thresholded values may be determined. A center of gravity module may be used to determine the center of the maximum region from the max location module. An x-y coordinates module may be used to provide the x and y display coordinates and a plot cross module may be used to display a cross on the display at the x-y coordinates of the center of gravity. The cross module may provide data regarding the existence of the "touch" and its location to the system and return control back to the start.

Periodically the display may become scratched or otherwise a foreign object will be stuck to the front of the display. In this case the display will tend to provide false readings that the scratch or foreign object is indicative of a touch. In order to reduce the effects of scratches and foreign objects one or more bright reference images I1 may be obtained over a period of time. The set of one or more bright reference images I1 may be averaged if an insubstantial difference exists between the images. This reduces the likelihood that the display was touched during one or more of the image acquisitions. In the event that the images are substantially different then the images may be reacquired until an insubstantial difference exists.

When operated at low ambient lighting conditions it is difficult to detect the touching of the display. While under normal ambient lighting conditions it is desirable to adjust the output of the display in relation to the black reference image (I0). However, it has been determined that under low ambient lighting conditions it is desirable to adjust the output of the display in relation to the bright reference image (I1). Accordingly, one particular implementation may be described by the following equation: $Ie=\{(Is-I1)/(I1-I0)\}$. The switching to night mode (low ambient lighting conditions) may be automatic or in response to a switch.

All references cited herein are hereby incorporated by reference.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A display device comprising:
    a stack of layers having a surface, the stack of layers being configured to display an image at the surface of the stack of layers;
    a first set of light sensitive elements included in the stack of layers, the first set of light sensitive elements having a first sensitivity to light and being configured to provide a first data set corresponding to an object on or near the surface; and
    a second set of light sensitive elements included in the stack of layers, the second set of light sensitive elements having a second sensitivity to light and being configured to provide a second data set corresponding to the object on or near the surface;
    wherein the first sensitivity to light is different from the second sensitivity to light, one and not the other of the first and the second data sets is selected and a location of the object on or near the surface is determined based on the selected data set.

2. The display device as recited in claim 1 wherein the sensitivity to light of each set of the first set and the second set of light sensitive elements is configured for a particular lighting condition.

3. The display device as recited in claim 1 wherein the first set of light sensitive elements is configured to sense light in a first lighting condition and the second set of light sensitive elements is configured to detect the object sense light in a second lighting condition, wherein the first lighting condition is different from the second lighting condition.

4. The display device as recited in claim 1 wherein the first and the second data sets are processed separately.

5. The display device as recited in claim 1 wherein the first and the second data sets are processed prior to the selection of the one data set.

6. The display device as recited in claim 1 further comprising a color filter layer in the stack of layers between the surface and at least a portion of the first and the second sets of light sensitive elements.

7. The display device as recited in claim 1 wherein each set of light sensitive elements is configured to sense light in response to one of an absence of light and an addition of light at the location of the object on or near the surface.

8. The display device as recited in claim 1 wherein each of the first set of light sensitive elements and the second set of light sensitive elements have components and wherein each of the first set of light sensitive elements and the second set of light sensitive elements are configured by selecting the components based on a particular lighting condition.

9. The display device as recited in claim 1 wherein each of the first set of light sensitive elements and the second set of light sensitive elements have components and wherein each of the first set of light sensitive elements and the second set of light sensitive elements are configured by selecting a dimension of the components based on a particular lighting condition.

10. The display device as recited in claim 8 wherein the components are capacitive elements.

11. The display device as recited in claim 8 wherein the components include phototransistors.

12. The display device as recited in claim 9 wherein the components include phototransistors.

13. The display device as recited in claim 12 wherein the dimension is selected based on photo-leakage current.

14. The display device as recited in claim 8 wherein the components include phototransistors and capacitive elements.

15. A method comprising:
    processing, by a display device comprising a stack of layers having a surface and being configured to display an image at the surface of the stack of layers, a first data set from a first set of light sensitive elements included in the stack of layers, the first set of light sensitive elements having a first sensitivity to light, the first data set corresponding to an object on or near the surface;
    processing, by the display device, a second data set from a second set of light sensitive elements included in the stack of layers, the second set of light sensitive elements having a second sensitivity to light, the second data set corresponding to the object on or near the surface, the first sensitivity to light being different from the second sensitivity to light; and
    selecting, by the display device, one and not the other of the first and the second data sets to determine a location of the object on or near the surface.

16. The method as recited in claim 15 wherein the display device processes the first and the second data sets separately.

17. The method as recited in claim 15 wherein the display device processes the first and the second data sets prior to the selection of the one data set.

* * * * *